United States Patent [19]
Nishimori et al.

[11] Patent Number: 5,638,460
[45] Date of Patent: Jun. 10, 1997

[54] METHOD OF EVALUATING OBJECT BASED UPON IMAGE PROCESSING AND INSPECTION APPARATUS USING SAID METHOD

[75] Inventors: Eiji Nishimori; Toshiaki Shingu, both of Yokohama, Japan

[73] Assignee: Canon Kabushiki Kaisha, Japan

[21] Appl. No.: 174,174

[22] Filed: Dec. 29, 1993

Related U.S. Application Data

[63] Continuation of Ser. No. 931,515, Aug. 21, 1992, abandoned, which is a continuation of Ser. No. 633,312, Dec. 24, 1990, abandoned.

[30] Foreign Application Priority Data

Dec. 29, 1989 [JP] Japan ................................. 1-343107
Dec. 29, 1989 [JP] Japan ................................. 1-343108

[51] Int. Cl.$^6$ .................................................. G06K 9/00
[52] U.S. Cl. ................................................... 382/141
[58] Field of Search ................................. 382/141, 148; 348/125, 126, 135

[56] References Cited

U.S. PATENT DOCUMENTS

| | | | |
|---|---|---|---|
| 4,589,140 | 5/1986 | Bishop et al. | 382/148 |
| 4,692,943 | 9/1987 | Pietzsch et al. | 382/8 |
| 4,757,550 | 7/1988 | Uga | 382/148 |
| 4,809,341 | 2/1989 | Matsui et al. | 382/148 |
| 4,817,184 | 3/1989 | Thomason et al. | 382/8 |
| 4,881,269 | 11/1989 | Billiotte et al. | 382/8 |
| 4,916,745 | 4/1990 | Hart et al. | 382/39 |
| 4,953,100 | 8/1990 | Yotsuya | 382/8 |
| 4,991,092 | 2/1991 | Greensite | 382/54 |
| 5,068,664 | 11/1991 | Appriou et al. | 382/39 |
| 5,079,545 | 1/1992 | Priem et al. | 340/747 |
| 5,123,057 | 6/1992 | Verly et al. | 382/14 |

FOREIGN PATENT DOCUMENTS

| | | |
|---|---|---|
| 328861 | 8/1989 | European Pat. Off. . |
| 2085628 | 4/1982 | United Kingdom . |

OTHER PUBLICATIONS

IEEE Transactions on Pattern Analysis and Machine Intelligence, vol. PAM, I3 No. 1, Jan. 1981, N.Y. USA, pp. 66–75 "A Clustering Performance Based on Fuzzy Set Decomposition" by Eric Backer et al.

15th Annual Conference of IEEE Industrial Electronics Society, vol. 1. Nov. 1989, Philadelphia USA pp. 584–589, "Automated Optical Inspection of Surface Mount Components using 2–D Machine Vision" by Yohko Watanabe.

IEEE Transactions on Pattern Analysis and Machine Intelligence , vol. 10, No. 1, Jan. 1988, New York, USA, pp. 31–43 "Automatic Solder Joint Inspection" by Sandra Bartlett et al.

"Algorithms of fuzzy clustering with partial supervision" by W. Pedrycz Pattern Recognition Letters 3 (1985) pp. 13–20.

"Application of Fuzzy Clustering Method with Additional Data to Area Division of Images" by K. Hirota et al. Hosei University Dept. of Physics Research publication No. 23, Mar. 1987, pp. 95–103.

"The Bounded Variation Quantity (B.V.Q.) and Its Application to Feature Extraction" by K. Hirota, Journal of the Pattern Recognition Society, 1982, No. 15, pp. 93–101.

"Upper and Lower Probabilities Induced by a Multivalued Mappling" by A. P. Dempster, Ann. Math. Statist., 1967, No. 38, pp. 325–339.

(List continued on next page.)

*Primary Examiner*—Jose L. Couso
*Attorney, Agent, or Firm*—Fitzpatrick, Cella, Harper & Scinto

[57] ABSTRACT

Disclosed is an evaluation method and apparatus used as when inspecting the mounted state of an IC. The evaluation method and apparatus are adapted to acquire the image of an object under inspection, subject the image to two types of image processing based upon two different evaluation methods, and inspect and evaluate the object as regards to the acceptability of soldered state, for example, based upon the results of the two evaluations.

7 Claims, 28 Drawing Sheets

U.S. PATENT DOCUMENTS

"Evidence Measures Based On Fuzzy Information"; by Dubois and Prade; Automatica, vol. 21, No. 5, Sep. 1985; pp. 547–562.

"Distributed Estimation, Inferencing and Multi–Sensor Data Fusion For Real Time Supervisory Control"; Harris; Proceesings of the IFAC Workshop, Shenyang, China, Sep. 21, 1989; pp. 19–24.

"Uncertainty Management In A Rule–Based Automatic Target Recogniser"; Keller and Hobson; SPIE; vol. 1095; Applications of Artificial Intelligence VII, Mar. 1989; pp., 126–137.

"Application Of Modified FCM With Additional Data To Area Division of Images"; Information Sciences, vol. 45; No. 1, Jul. 1988, pp. 213–230.

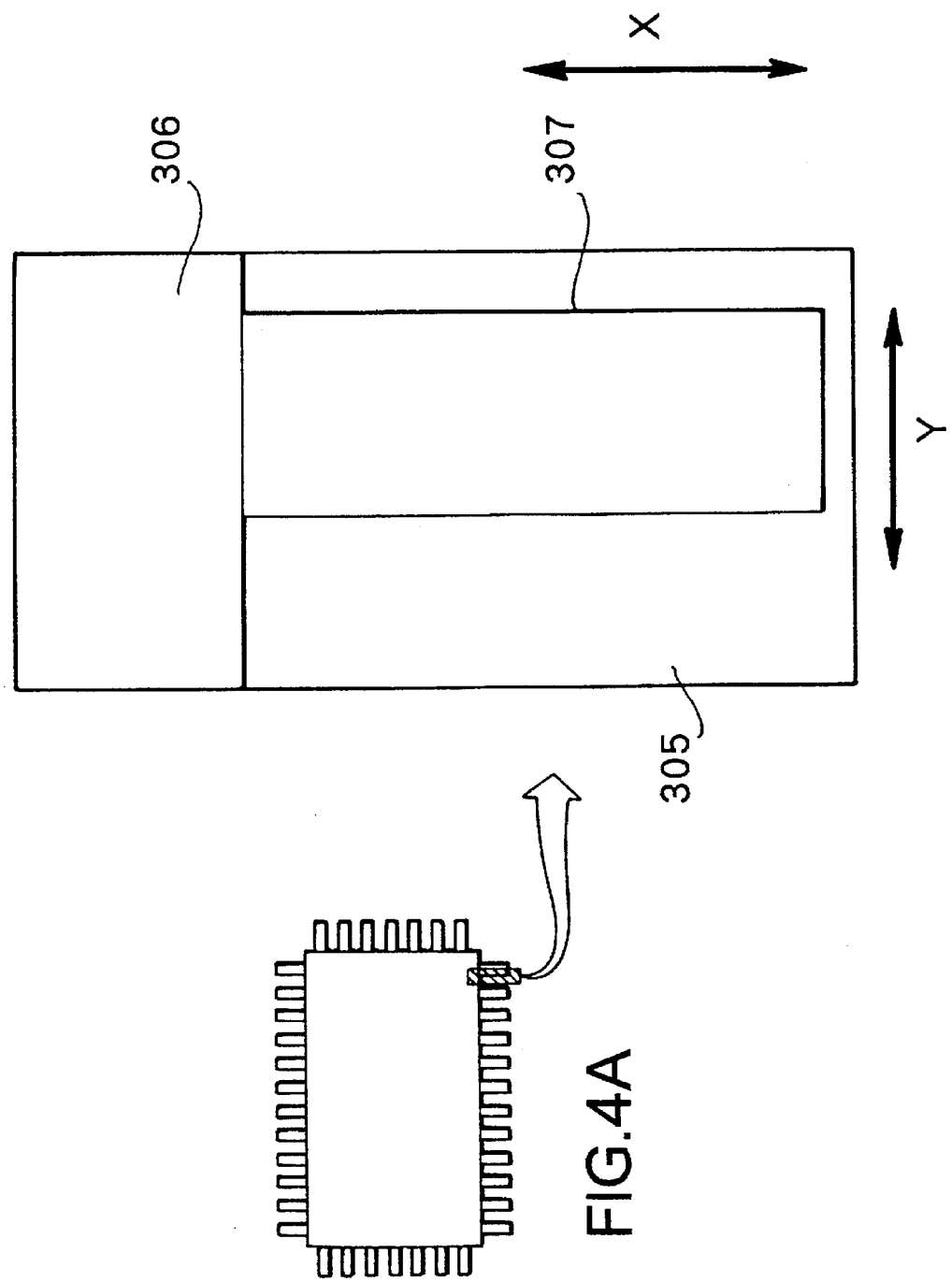

| F1 CIRCUMSCRIBED RECTANGLE $X_L$ | F2 CIRCUMSCRIBED RECTANGLE $Y_U$ | F3 CIRCUMSCRIBED RECTANGLE $X_R$ | F4 CIRCUMSCRIBED RECTANGLE $Y_D$ |
|---|---|---|---|
| F5 CENTER POSITION $X_G$ | F6 CENTER POSITION $Y_G$ | F7 ASPECT RATIO | F8 X MEAN LENGTH: X MAXIMUM LENGTH |
| F9 Y MEAN LENGTH: Y MAXIMUM LENGTH | F10 AREA | F11 AREA DENSITY | F12 X-DIRECTION OFFSET |
| F13 Y-DIRECTION OFFSET | F14 PERIMETER | F15 SIZE | F16 PERIMETER: SURFACE RATIO |
| F17 X AXIS PERIPHERAL DISTRIBUTION VARIANCE | F18 Y AXIS PERIPHERAL DISTRIBUTION VARIANCE | F19 MEAN | F20 VARIANCE |
| F21 BOUNDED VARIATION QUANTITY BVQ 1 | F22 BOUNDED VARIATION QUANTITY BVQ 2 | F23 BOUNDED VARIATION QUANTITY BVQ 3 | F24 BOUNDED VARIATION QUANTITY BVQ 4 |

FIG.11

NORMAL

FLOATING

SOME FLOATING

BRIDGE

SOLDER BALL

SHORTAGE OF SOLDER

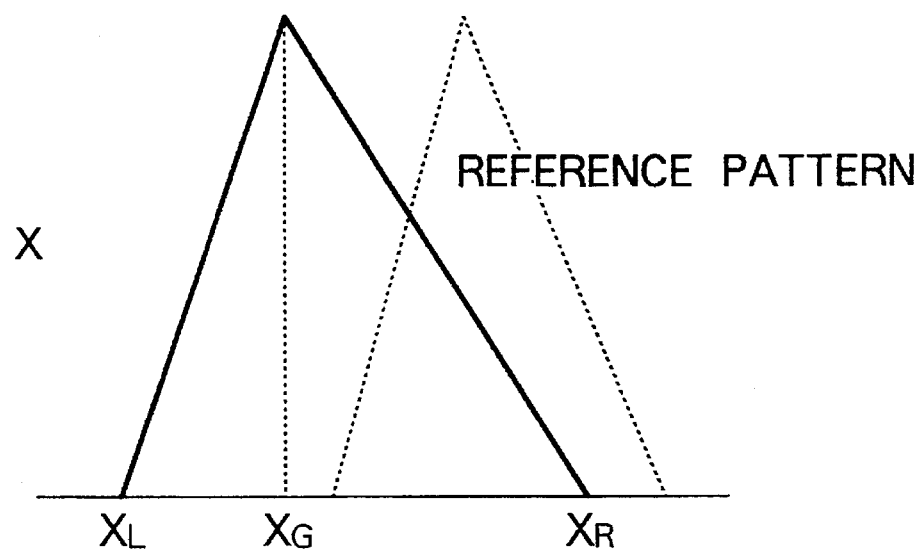
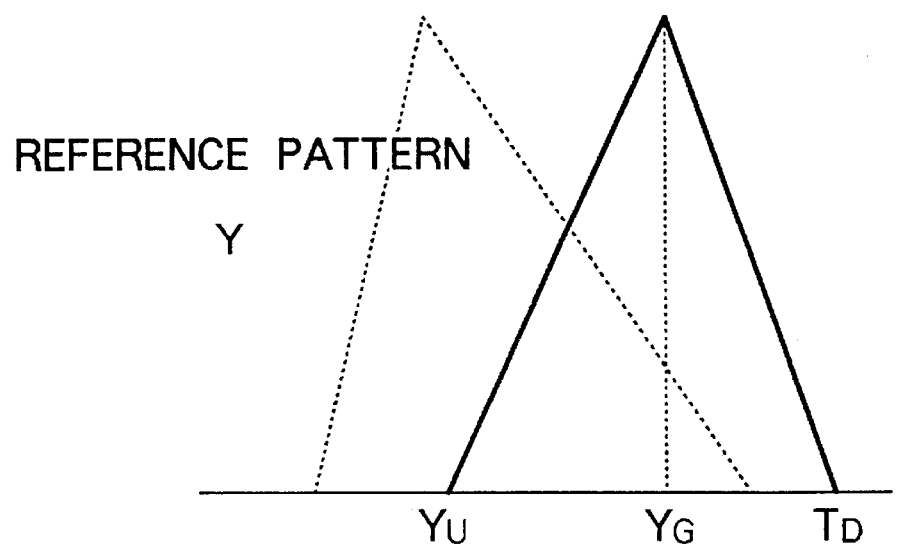
FIG.22A

| t | τ (LTV) |
|---|---|
| 0 | COMPLETELY FALSE |
| 0.19 | VERY FALSE |
| 0.25 | FALSE |
| 0.31 | RATHER FALSE |
| 0.50 | TOSS – UP BETWEEN TRUE AND FALSE |
| 0.69 | RATHER TRUE |
| 0.75 | TRUE |
| 0.81 | VERY TRUE |
| 1.0 | COMPLETELY TRUE |

LINGUISTIC MEANING OF t

FIG.22B

| REGION | | NORMAL (LEAD PORTION) | NORMAL (SOLDERED PORTION) | FLOATING | SOME FLOATING | BRIDGE | SOLDER BALL | SHORTAGE (LEAD PORTION) | SHORTAGE (SOLDERED PORTION) |
|---|---|---|---|---|---|---|---|---|---|
| 1 | a | .018 | .822 | .024 | .043 | .030 | .019 | .018 | .027 |
| 1 | b | .269 | .100 | .051 | .323 | .848 | .000 | .188 | .000 |
| 1 | c | .071 | .616 | .640 | .000 | .496 | .109 | .113 | .669 |
| 1 | d | .010 | .734 | .013 | .022 | .030 | .019 | .011 | .014 |
| 2 | a | .144 | .016 | .550 | .002 | .002 | .000 | .135 | .151 |
| 2 | b | .776 | .729 | .687 | .776 | .577 | .000 | .134 | .630 |
| 2 | c | .263 | .319 | .702 | .110 | .258 | .000 | .301 | .351 |
| 2 | d | .114 | .013 | .634 | .001 | .002 | .000 | .111 | .131 |
| 3 | a | .010 | .095 | .002 | .362 | .004 | .000 | .008 | .014 |
| 3 | b | .333 | .000 | .245 | .271 | .126 | .000 | .415 | .033 |
| 3 | c | .463 | .000 | .042 | .643 | .000 | .000 | .341 | .000 |
| 3 | d | .008 | .050 | .001 | .304 | .002 | .000 | .007 | .007 |

CONSEQUENCE * * *

POSSIBILITY OF FLOATING : 63.4 %
POSSIBILITY OF A SOME FLOATING : 63.0 %
POSSIBILITY OF BRIDGE : 3.0 %
POSSIBILITY OF SOLDER BOLL : 1.9 %
POSSIBILITY OF SHORTAGE : 31.1 %

FIG.26

METHOD OF EVALUATING OBJECT BASED UPON IMAGE PROCESSING AND INSPECTION APPARATUS USING SAID METHOD

This application is a continuation of application Ser. No. 07/931,515, filed Aug. 21, 1992, now abandoned, which is a continuation of application Ser. No. 07/633,312, filed Dec. 24, 1990, abandoned.

BACKGROUND OF THE INVENTION

This invention relates to a method of evaluating an object in which an input image is processed using fuzzy logic, and to an inspection apparatus in which this evaluation method is applied to, e.g., inspection of circuit board mounting.

In recent years there has been increasing demand for electronic devices which are smaller in size and weight and provided with a multiplicity of functions. Surface mounting techniques are being developed in order to satisfy this demand.

However, it has not been long since the birth of surface mounting techniques, and since precedence has been given to the miniaturization of parts, it cannot truly be said that these techniques have firmly taken root in production processes. Much progress still needs to be made in these techniques. In particular, there is a special demand for automation of a process for inspecting the external appearance of objects.

Items which need to be inspected by an automatic apparatus for inspecting external appearance are as follows, by way of example:

(1) the absence or presence of parts, and whether parts are mounted in the proper attitude;
(2) whether the mounted state of a part is proper or faulty;
(3) whether or not a mounted part is the wrong part; and
(4) whether the soldered state of a part is proper or faulty.

It is hoped that inspection of all of these items which presently are inspected visually will be performed by an automatic inspection of external appearance.

With regard to items (1) through (3), image processing is adequate and a variety of inspection apparatus which rely upon image processing are available on the market. In connection with the inspection of soldered condition in item (4), quantitative evaluation is difficult. For this reason, though various methods have been proposed and given consideration, reliable methods have yet to be developed and the state of the art is such that almost all of these methods rely upon visual inspection.

Accordingly, the inventors have considered applying image processing technology to inspection instead of relying upon visual inspection. Clustering processing is known as one image processing technique capable of being applied to inspection of a mounted state in order to evaluate the mounted state. Clustering entails evaluating certain characterizing quantities based upon reference data. More specifically, clustering involves matching a reference pattern and an input pattern and categorizing an input pattern having a high degree of similarity in a class the same as that of the predetermined reference pattern.

However, in a case where the aforementioned conventional clustering is used in evaluation of an input image in image processing (e.g., evaluation of the mounted state of a part on a printed circuit board), a recognition error can arise if a characterizing quantity is evaluated unconditionally. There is the danger that this will have a deleterious influence upon image processing.

In addition, when the characterizing features of an image are evaluated, it stands to reason that there will be characterizing quantities which do not lend themselves to evaluation by clustering processing.

SUMMARY OF THE INVENTION

Accordingly, an object of the present invention is to provide an inspection apparatus capable of performing inspection, such as the inspection of soldering, using fuzzy logic that is capable of quantifying the qualitative thought and judgmental processes of human beings.

Another object of the present invention is to provide an evaluation method wherein clustering processing which exhibits little misrecognition when evaluating an object is applied to an image of the object, whereby the object is evaluated.

A further object of the present invention is to provide an inspection apparatus and an evaluation method in which fuzzy clustering processing effective in evaluating shape and color as characterizing quantities of an object to be evaluated is applied to these characterizing quantities, while a reverse truth-value definition method that is effective in evaluating position as a characterizing quantity of the object is applied to this characterizing quantity, whereby an evaluation method suited to the characteristics of the object under evaluation or of an object under inspection is used to enhance the precision of both inspection and evaluation.

A yet further object of the present invention is to provide an inspection apparatus capable of inspecting the surface of a substrate board on the basis of an image of the board.

A further object of the present invention is to provide an image processing method capable of evaluating an image on the basis of multivalued image data and binary data thereof.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4A is an enlarged view of an IC chip;

FIG. 4B is an enlarged view the lead-wire portion of the IC chip;

FIG. 11 is a diagram showing characterizing quantities to be extracted;

FIGS. 22A and 22B are diagrams for describing a reverse truth-value definition method;

FIG. 26 is a diagram showing the results of Dempster coupling; and

DESCRIPTION OF THE PREFERRED EMBODIMENT

Embodiments in which the present invention is applied to an apparatus for inspecting a soldered state.

Construction of Apparatus Embodying the Invention

Figure 1:
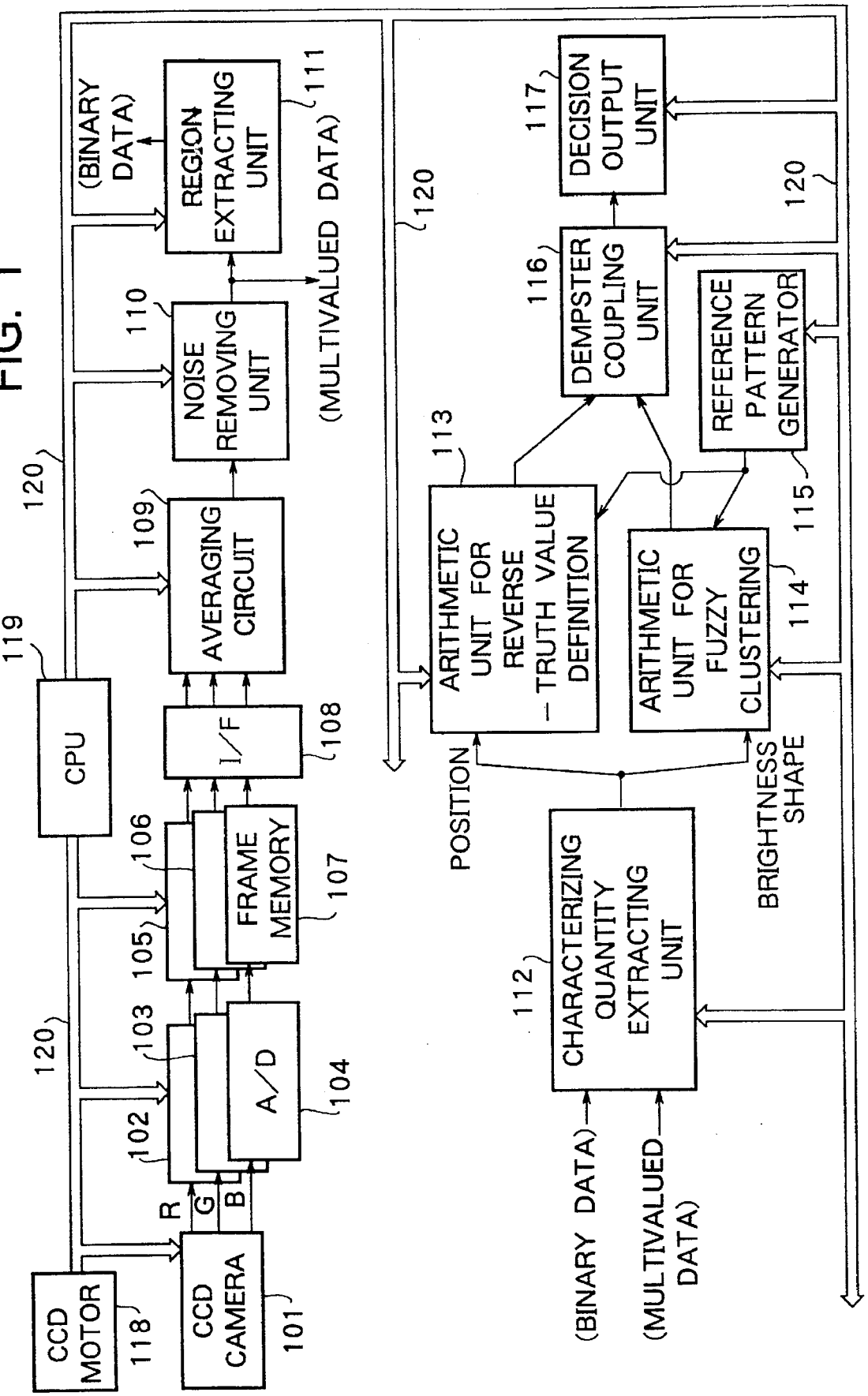
FIG. 1 is an overall block diagram of an apparatus for inspecting mounting of parts on a circuit board in a preferred embodiment of the present invention.

FIG. 1 is a block diagram illustrating the overall construction of an apparatus for inspecting soldered state according to the present embodiment.

As shown in FIG. 1, the inspection apparatus is adapted to subject an image read by a CCD camera 101 to image processing in successive fashion and to eventually output, from a decision output unit 117, the result of a decision regarding soldered state. In FIG. 1, the blocks are actual elements constituting the inspection apparatus, and the arrows formed of double lines indicate a bus line 120. Though the actual data flows along the bus line 120, the flow of data in accordance with processing is indicated by the single-line arrows in FIG. 1.

More specifically, the inspection apparatus of FIG. 1 includes the CCD camera 101 which reads image data as analog signals R, G, B. The analog signals read by the CCD camera 101 are applied to respective analog/digital converters 102, 103, 104 which convert these analog signals into digital data. Frame memories 105, 106, 107 store the respective items of digital data obtained by the conversion of the R, G and B signals. The digital data are delivered via an interface 108 to an averaging circuit 109, which calculates the average value of R, G and B for every pixel. The output of the averaging circuit 109 is delivered to a noise removing circuit 110. A region extracting unit 111 receives the output of the noise removing unit 110. Numeral 112 denotes a unit for extracting characterizing quantities.

Numeral 113 denotes a reverse truth-value arithmetic unit for performing an arithmetic operation in accordance with a reverse truth-value definition method, and numeral 114 denotes a fuzzy clustering arithmetic unit for performing an arithmetic operation in accordance with fuzzy clustering. A reference pattern generator 115 generates reference patterns. A Dempster coupling unit 116 couples the results of the operation in accordance with the reverse truth-value definition method and the results of the operation in accordance with fuzzy clustering. Numeral 117 designates the decision output unit for outputting the final results of decision processing. Fuzzy clustering and the reverse truth-value decision, which are the most significant characterizing features of the embodiment, will be described later in greater detail.

A motor 118 is for rotating the CCD camera 101 or for moving the CCD camera in a two-dimensional plane. A controller 119 is for controlling the drive of the motor 118, addressing of the memories, etc.

The R (red), G (green) and B (blue) analog image signals read in from the CCD camera 101 are each converted into multivalued digital data by the A/D converters 102, 103, 104, respectively, and these data are stored in the respective frame memories 105, 106, 107. These image data are sent to the averaging circuit 109 through the interface 108. The circuit 109 calculates average-value data. Noise contained in the resulting averaged data is removed by the noise removing unit 110.

The image data from which the noise has been removed are subjected to image processing such as matching based upon region extraction and fuzzy logic implemented by the extracting unit 112 and arithmetic units 113, 114. More specifically, based upon the image data from the noise removing unit 110, the region extracting unit 111 extracts, in the form of binary data (a map), a region which is the object of inspection for the purpose of extracting characterizing quantities (described later). From the region thus extracted, the characterizing quantity extracting unit 112 extracts characterizing quantities (FIG. 11) relating to position information, brightness information, shape information, etc. A characterizing quantity relating to position information is sent to the arithmetic unit 113. Also delivered to the arithmetic unit 113 are the reference patterns from the reference pattern generator 115. In accordance with the reverse truth-value limitation method, the arithmetic unit 113 performs matching between the position information from the extracting unit 112 and the reference patterns from the reference pattern generator 115.

Meanwhile, characterizing quantities relating to brightness information and shape information are sent to the arithmetic unit 114 which, by fuzzy clustering, performs matching between these items of information and the reference patterns.

The two results of the operations performed by the two arithmetic units 113, 114 are combined by the Dempster coupling unit 116 in accordance with the Dempster-Shafer coupling rule. The final results of the decision, which exhibit a higher degree of reliability, are outputted from the decision output unit 117.

Figure 2:
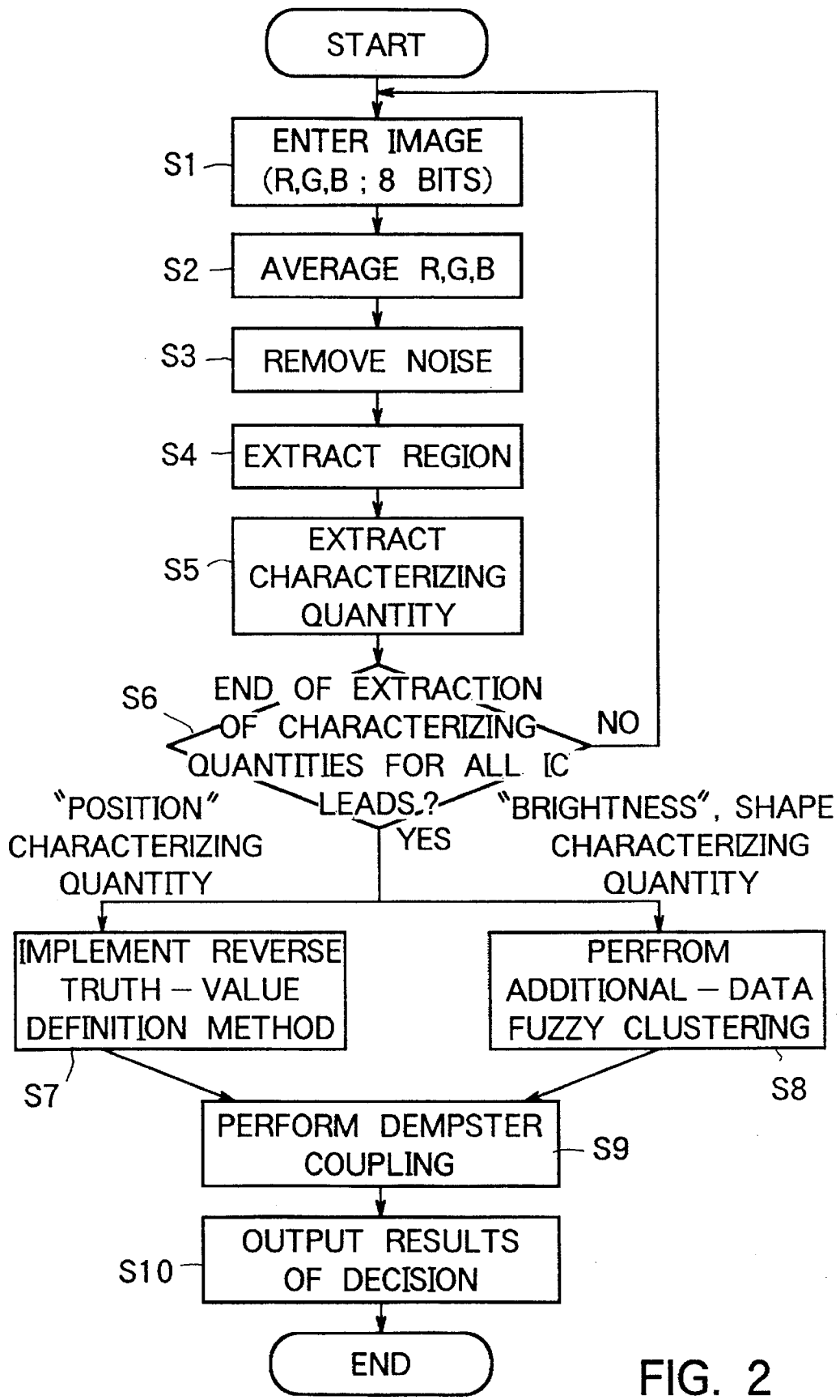
FIG. 2 is a flowchart illustrating the overall processing of the inspection according to this embodiment.

The foregoing is a description of the operation of the elements constituting the inspection apparatus shown in FIG. 1. The overall control of the operation of these elements is carried out by the controller 119. FIG. 2 is a flowchart showing the control procedure of the controller 119 in a case where the present invention is applied to inspection of the soldered state of a lead terminal of an IC (not shown) soldered to a printed circuit board.

It will be assumed that the IC soldered to the printed circuit board has been placed in the imaging field of the camera 101 prior to execution of the control procedure of FIG. 2.

FIG. 4A is a diagram illustrating the IC which is the object of inspection. The shaded portion in FIG. 4A is shown in FIG. 4B in enlarged form. In FIG. 4B, numeral 305 denotes a space devoid of solder, 306 a portion of the IC package, and 307 the lead portion of the IC. The camera portion of the inspection apparatus of this embodiment has a construction of the kind shown in FIG. 3A. Specifically, a plate 302 is a circuit board which is the object of inspection. Numeral 301 denotes a table on which the circuit board 302 is placed. Numeral 303 denotes a CCD camera, 304 a unit for moving the CCD camera, and 305 a belt conveyor.

The CCD camera moving unit 304 moves the CCD camera 303 in the X and Y directions and rotates the camera in the θ direction to enable image input of all IC leads.

The overall control procedure of this embodiment will now be described with reference to the flowchart of FIG. 2.

Control Procedure

Step S1

At this step, the image of the vicinity of the first lead of the IC is read in pixel by pixel in the form of eight bits with regard to each of the color components R, G and B from the CCD camera 101, which serves as the image input unit. The image of the vicinity of this lead terminal is stored in the frame memory as a result of the processing of step S1.

Step S2

At step S2, the average value (R+G+B)/3 of the R, G, B data entered at step S1 is calculated to effect a conversion into a monochrome image.

At step S2, the monochromatic conversion of the color image is implemented by the RGB averaging processing. The reason for producing the monochromatic image is that the present embodiment is directed to inspection of soldered joints, and color is not that an important a parameter in performing such an inspection. In view of this point, instead of averaging the three primary color components R, G and B, any one of the monochromatic components R, G, B can be used or, since the G (green) signal approximates an ND image, the G monochromatic component can be used. In either case, this will make it possible to simplify the apparatus. Further, besides the RGB signals, Y, I and Q can be used as a combination of luminance and chromaticity. In addition, an arrangement can be adopted in which inputs are made in the form of such color components as L*, a*, b* and a luminance component is used.

Furthermore, though color is not that important a parameter in inspection of soldering, an arrangement can be adopted in which decisions are made upon adding a chromaticity parameter to the monochromatic component, as may be required for application to other fields.

Step S3 (Noise Removal)

Figure 6:
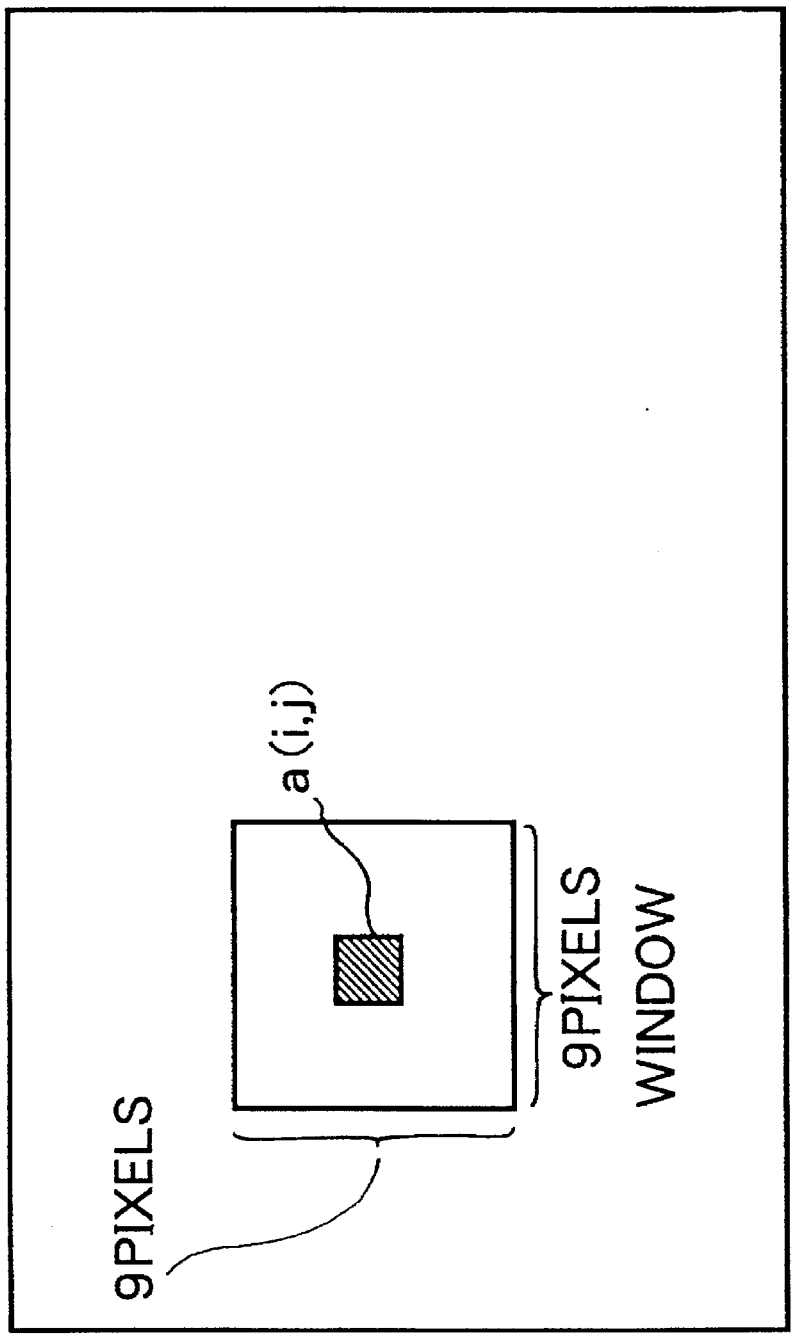
FIG. 6 is a diagram showing a window for the purpose of noise removal.

The image whose monochromatic components have been extracted at step S2 is subjected to noise removal (isolated-point removal) in the noise removing unit 110 of FIG. 1. In this embodiment, a median filter of 9×9 pixels of the kind shown in FIG. 6 is used in order to remove noise.

Figure 5:
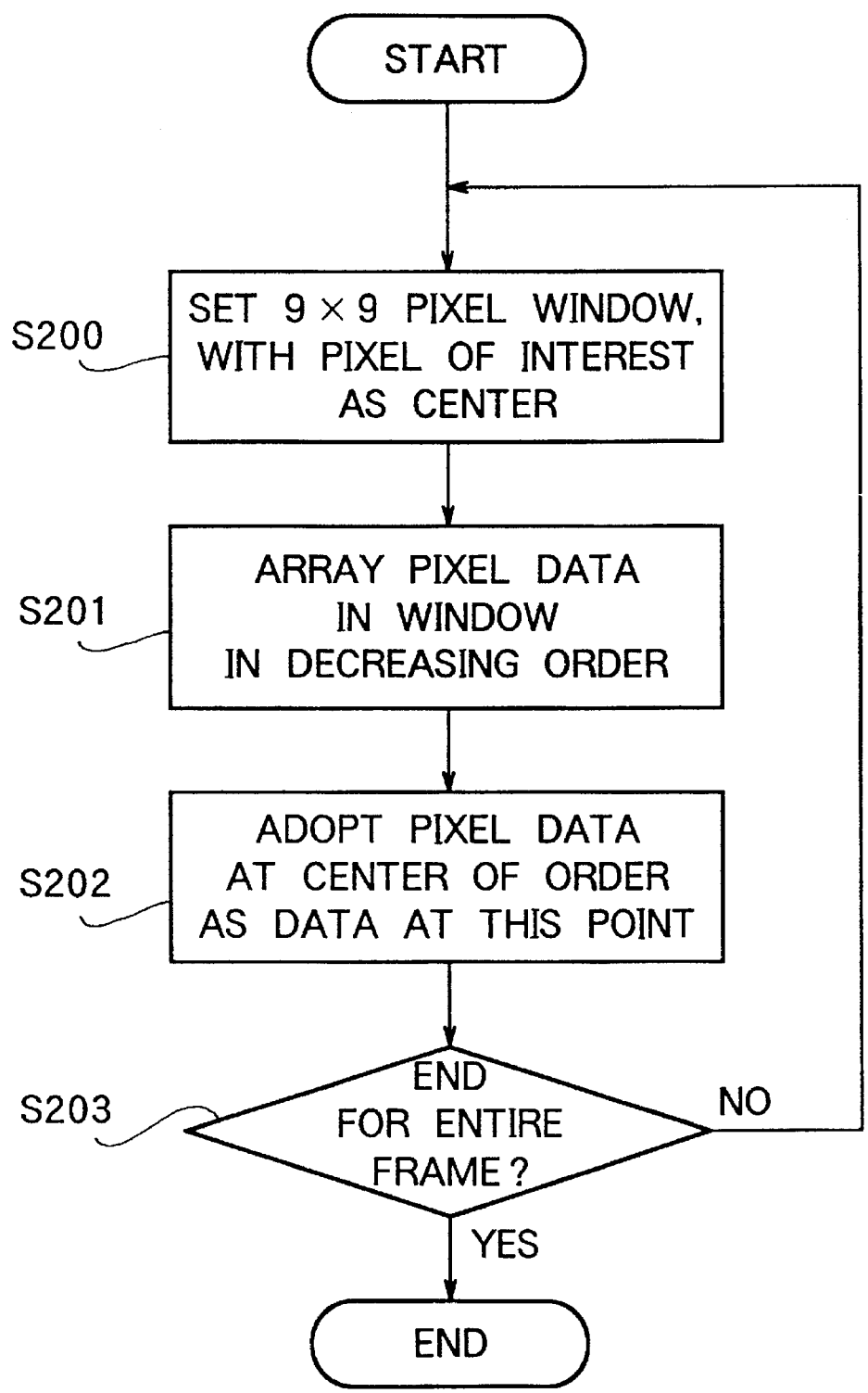
FIG. 5 is a flowchart of noise removal.

The algorithm of the median filter is illustrated in FIG. 5. Specifically, obtaining an output from the median filter with regard to one point of interest entails acquiring a window (9×9 pixels) in which this point is adopted as the center (step S200), arraying the data inside the window in decreasing order (step S201), and adopting the data in the exact middle of the order as the value at this point (step S202). This processing is executed over the entire image frame (step S203).

It should be noted that an expedient such as a smoothing filter can be used instead of the median filter. In addition, the filter size is not limited to 9×9 pixels.

Step S4 (Region Extraction)

Figure 10:
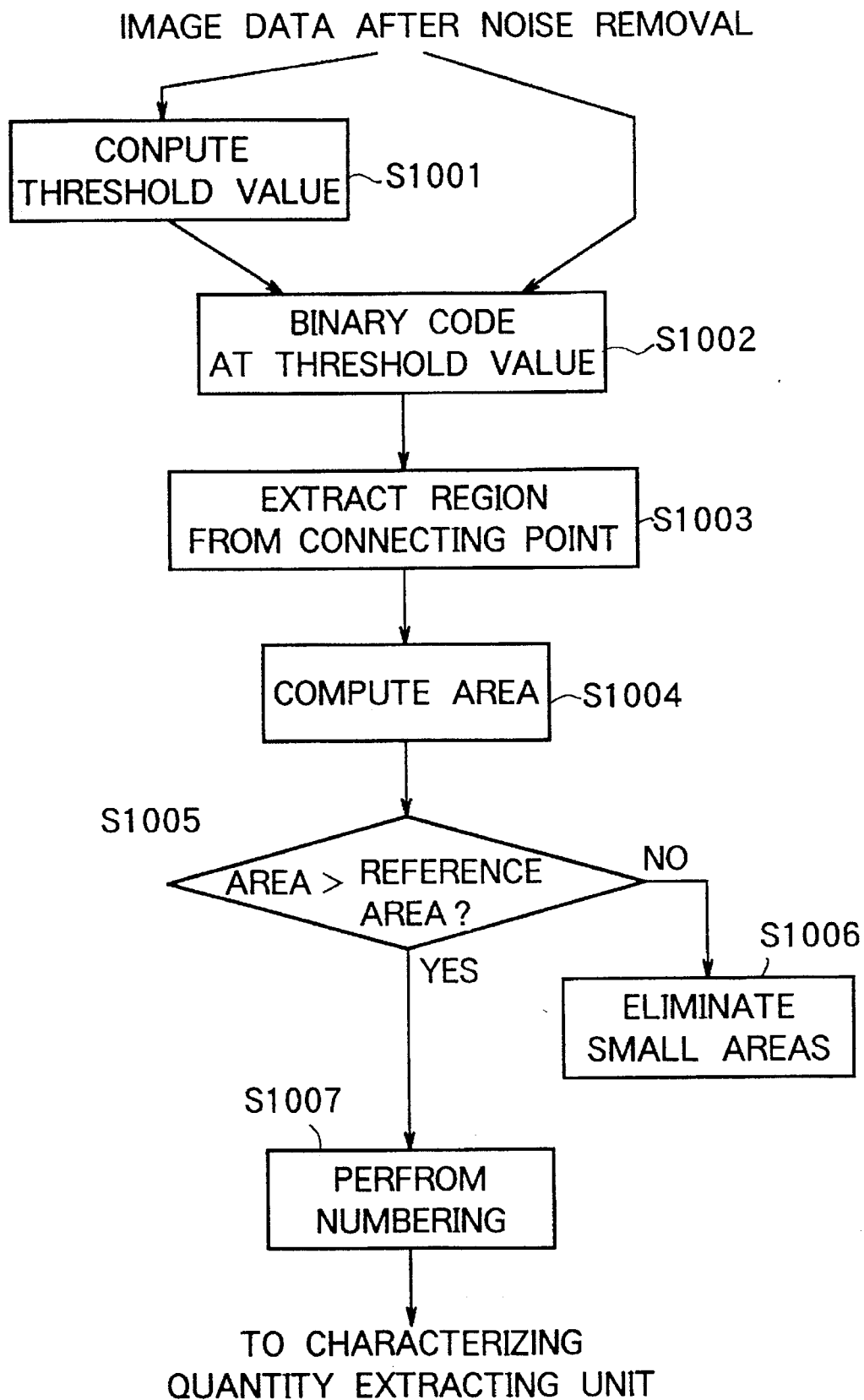
FIG. 10 is a flowchart illustrating the control procedure of region-extraction processing.

At step S4, region extraction is performed by the region extracting unit 111 in FIG. 1. The algorithm of such region extraction is shown in FIG. 10.

Figure 7:
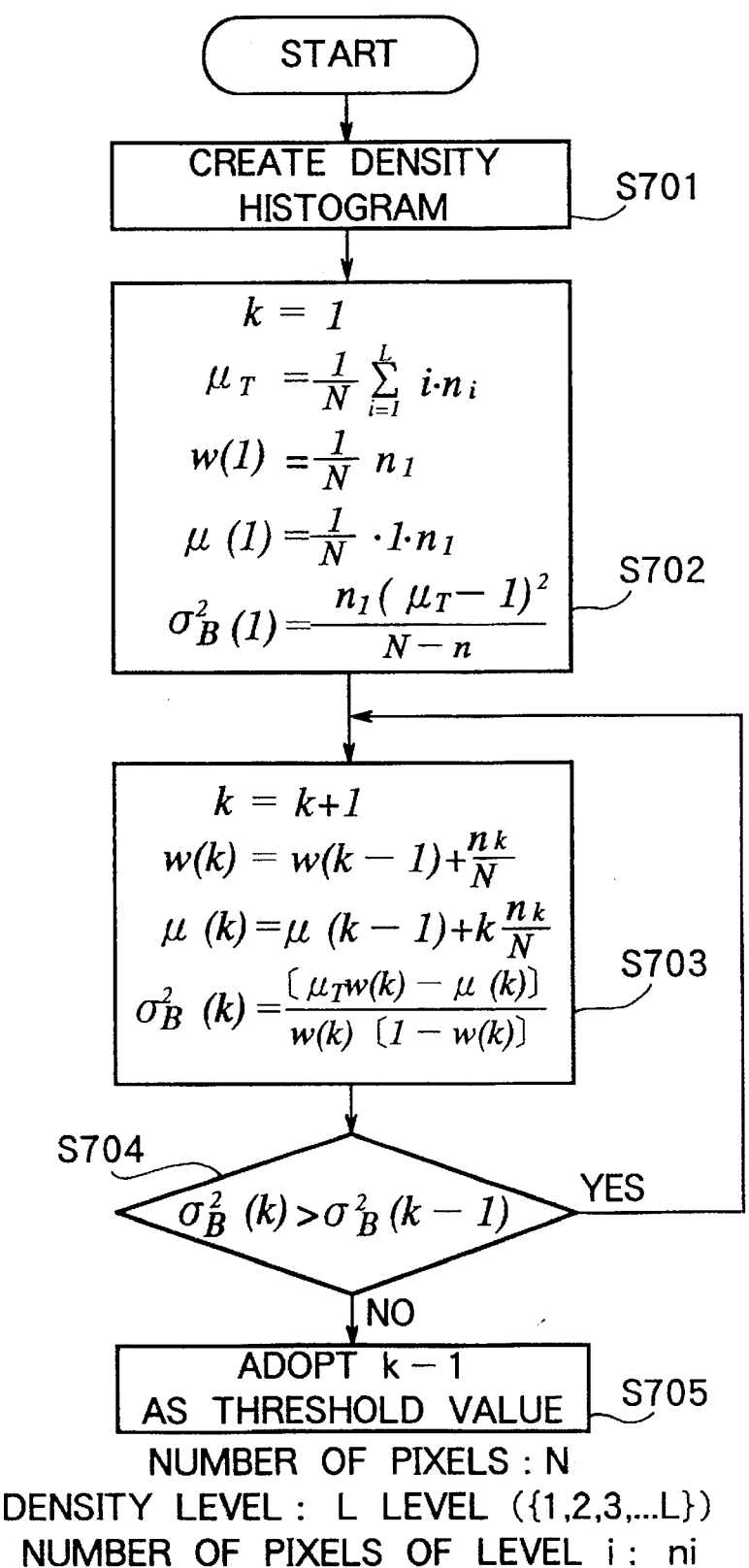
FIG. 7 is a flowchart of a control procedure for detection of threshold value in the processing of a discriminatory analytical method.

The image data from which noise has been removed is binary coded by a predetermined threshold value at steps S1001, S1002 in order to extract a region. In order to decide a threshold value to perform this binary coding, a discriminatory analytical method is used (S1001). The algorithm of the discriminatory analytical method is shown in FIG. 7. This algorithm entails forming a density histogram of the image from which noise has been removed, and obtaining, by repeated computation based upon the histogram, a threshold K which maximizes the variance $\sigma_B^2(K)$.

Figure 8:
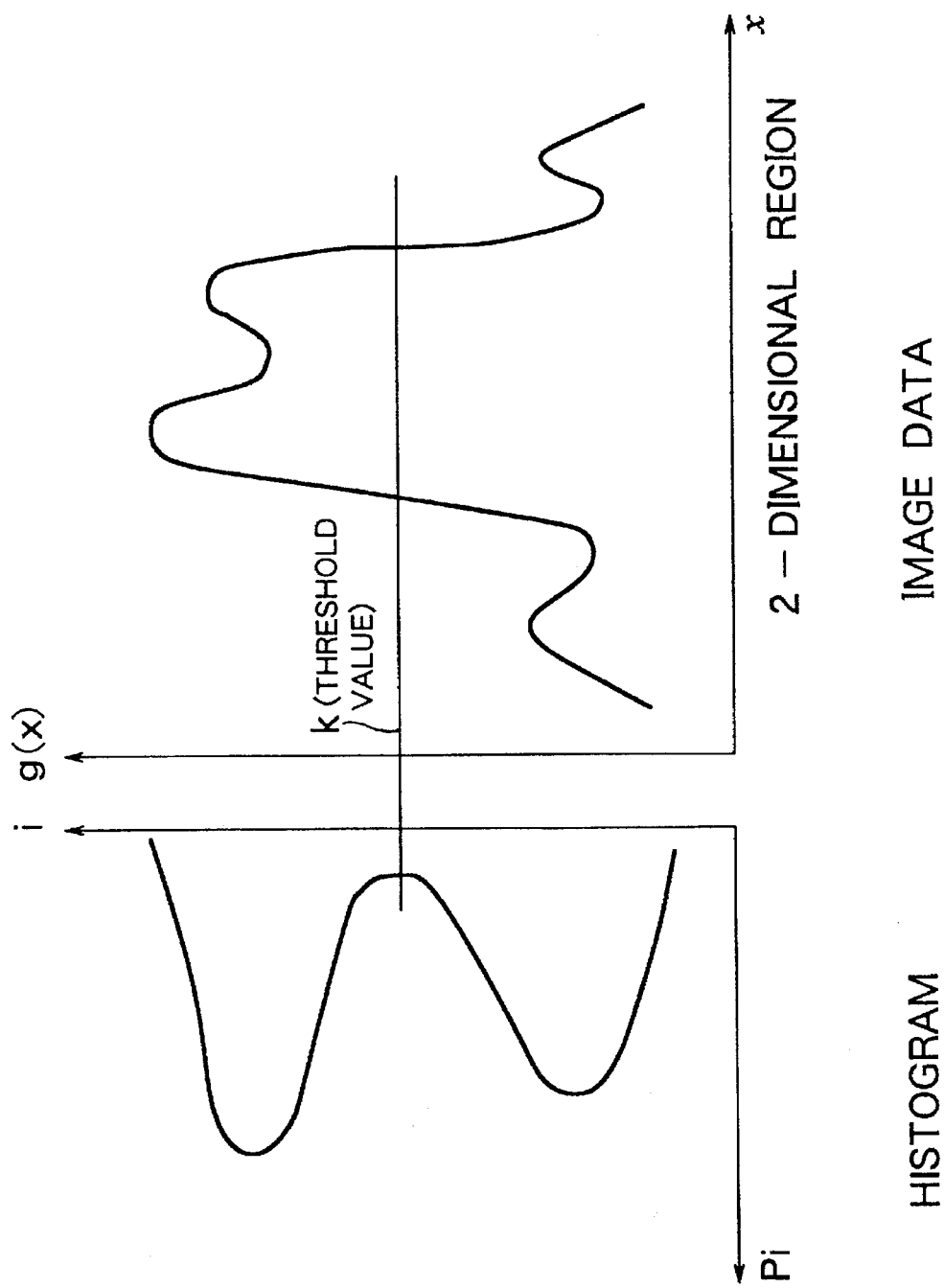
FIG. 8 is a diagram showing the principle of threshold-value detection in a binary coding method of the embodiment.

More specifically, a step S701 calls for the creation of a density histogram (see FIG. 8) of the image whose noise has been removed by the noise removing unit 110. In FIG. 8, the x axis is the longitudinal direction of the lead terminal image 307, as shown in FIG. 4B, and g(x) is the density value in the x direction. Accordingly, the graph on the right side of FIG. 8 illustrates the density distribution with regard to the x direction, and the graph on the left side of FIG. 8 is obtained by plotting density i along the vertical axis and the frequency P of occurrence along the horizontal axis. Deciding the threshold value k by the discriminatory analytical method indicated by the flowchart of FIG. 7 involves computing the variance $\sigma_B^2(k)$ while incrementing the density i (=k) from 1 in FIG. 8, and adopting, as the threshold value, the density k for which the variance $\sigma_B^2(k)$ changes from an increasing value to a decreasing value.

At step S702, various variables such as k, μ and w for computing the variance $\sigma_B^2(k)$ are initialized. That is, initializing is performed as follows at step S702:

$$k = 1$$

$$\mu_T = \frac{1}{N} \sum_{i=1}^{L} i \cdot n_i \qquad (1)$$

$$w(l) = \frac{1}{N} \cdot n_1 \qquad (2)$$

$$\mu(l) = \frac{1}{N} \cdot 1 \cdot n_1 \qquad (3)$$

$$\sigma_B^2(1) = \frac{n_1(\mu_T - 1)^2}{N - n_1} \qquad (4)$$

At step S703, the variable k is incremented by 1 (k=k+1), and by using $$w(k) = w(k-1) + \frac{n_k}{N} \quad (5)$$

$$\mu(k) = w(k-1) + K \cdot \frac{n_k}{N} \quad (6)$$

the following is computed:

$$\sigma_B^2(k) = \frac{[\mu_T \cdot w(k) - \mu(k)]^2}{w(k)[1 - w(k)]} \quad (7)$$

At step S704, the last computed $\sigma_B^2(k-1)$ and the currently computed $\sigma_B^2(k)$ are compared, and the program proceeds to step S705 at the moment the following inequality is established:

$$\sigma_B^2(k) > (\sigma_B^2(k-1)) \quad (8)$$

When Eq. (8) is established, this indicates that increasing k any further will increase the variance $\sigma_B^2(k)$, namely that the threshold value k will shift from the first peak and reach the second peak of the curve $P_i$ of the histogram shown in FIG. 8. In other words, the k obtained by subtracting "1" (step S705) from the initial k which satisfies Eq. (8) is the threshold value sought. The region extracting unit 111 uses this threshold value k to perform the binary coding (step S1002).

Further, at step S1003 in FIG. 10, the binary-coded image data are searched for connecting points connecting "1" dots. These connecting points are adopted as a candidate region for extracting characterizing features (step S1003).

Next, at step S1004, area is computed by counting the number of dots with regard to each candidate region. Then, at step S1005, small regions having an area less than an already given region are regarded as noise, and these small regions are eliminated at step S1006.

Figure 9:
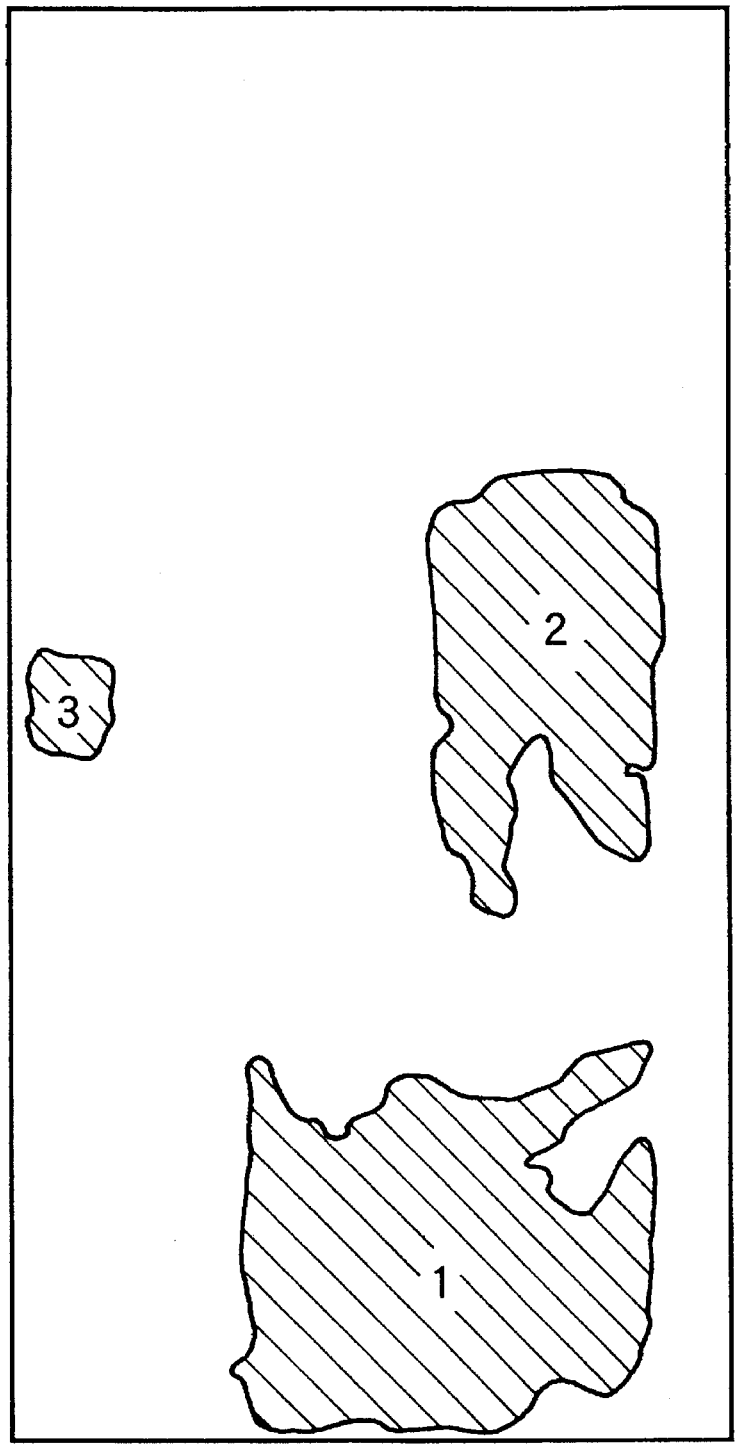
FIG. 9 is a diagram showing an example of region extraction and numbering.

Regions remaining following elimination of the small regions as noise are numbered (labeled) at step S1007. The image obtained following this numbering is illustrated in FIG. 9. In the example of FIG. 9, regions numbered 1, 2 and 3 remain.

Thus, the characterizing quantity extracting unit 112 is provided by the noise removing unit 110 with multivalued image data from which noise has been removed, and by the region extracting unit 111 with binary region information.

Step S5 (Characterizing Quantity Extraction)

Step S5 calls for the characterizing quantity extracting unit 112 to subject each numbered region to characterizing quantity extraction. An example of characterizing quantities using the present embodiment is illustrated in FIG. 11. According to this embodiment, 24 characterizing quantities from $F_1$ to $F_{24}$ are used.

Figure 12:
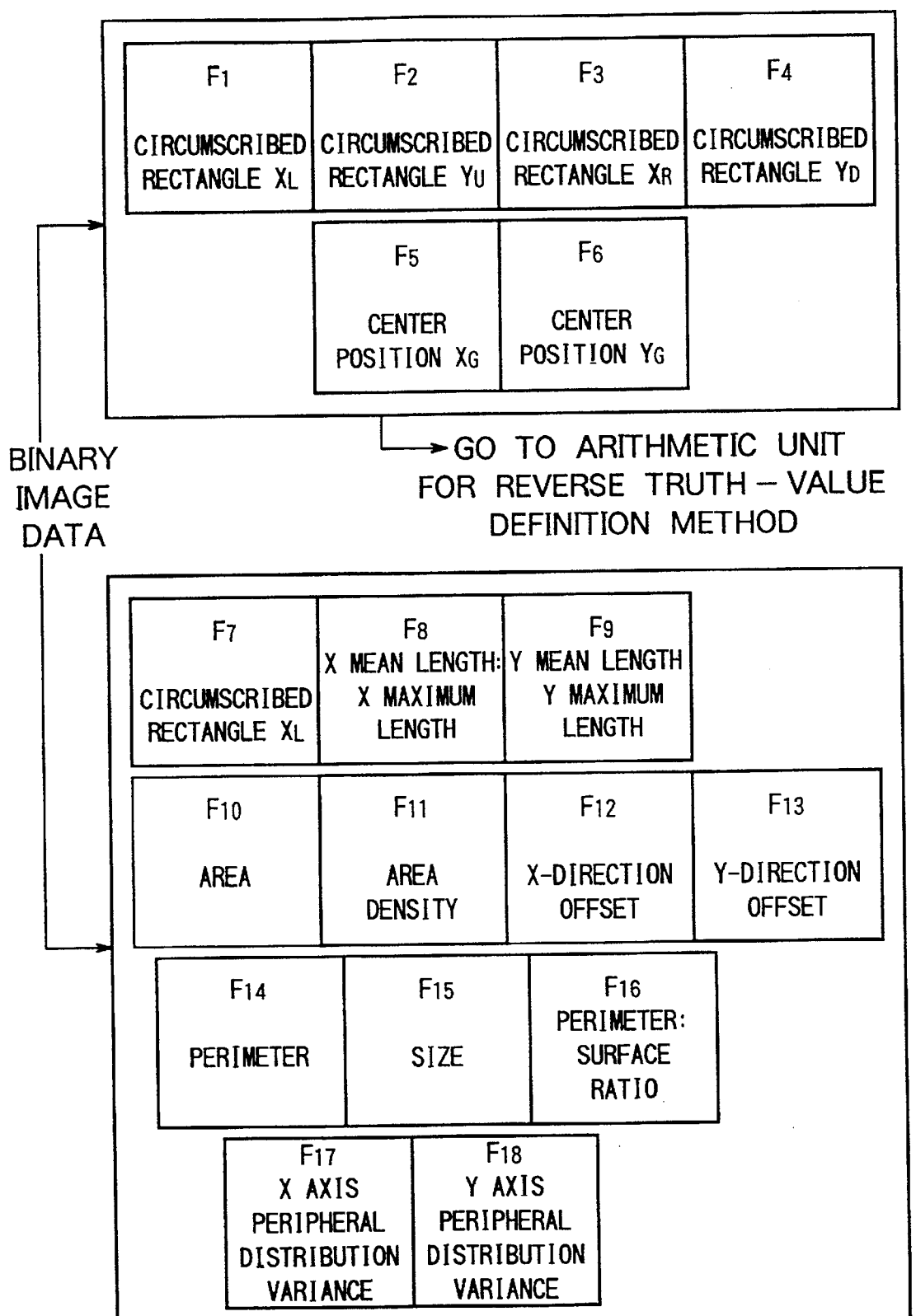
FIG. 12 is a diagram showing the flow of processing of binary image data.
Figure 13:
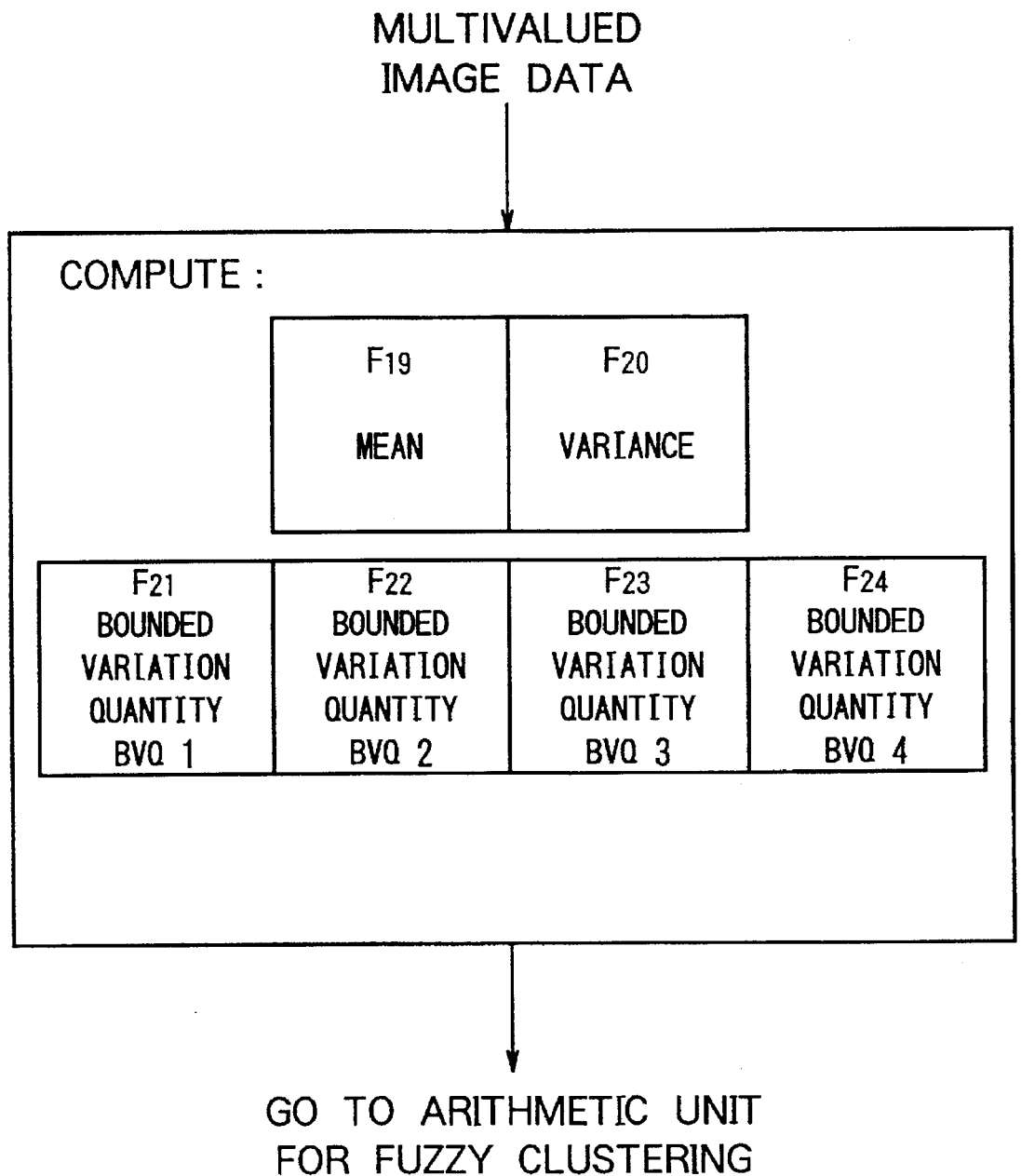
FIG. 13 is a diagram showing the flow of multivalued image data.
Figure 14:
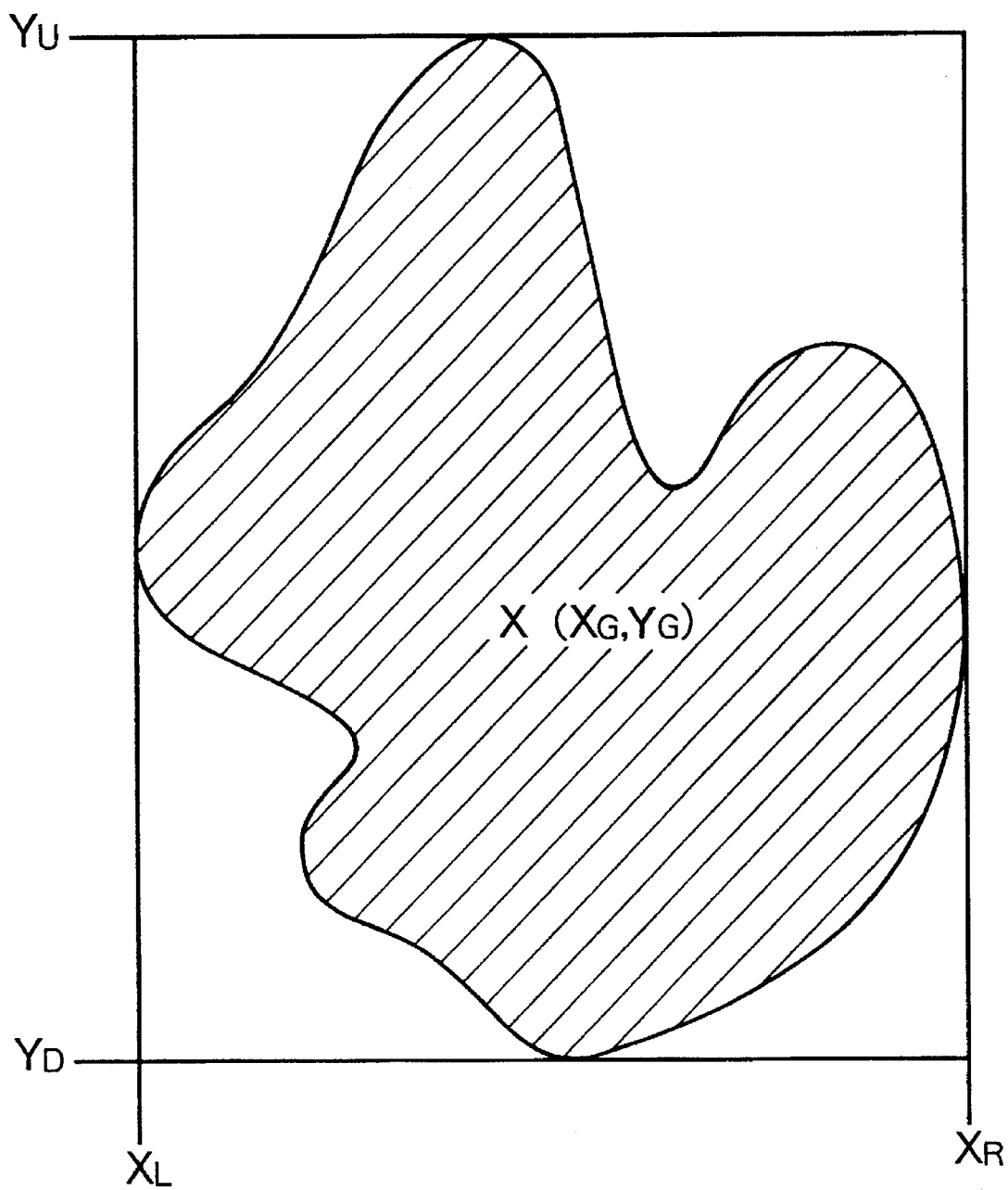
FIG. 14 is a diagram showing the relationship between a circumscribed rectangle and center of gravity.
Figure 15:
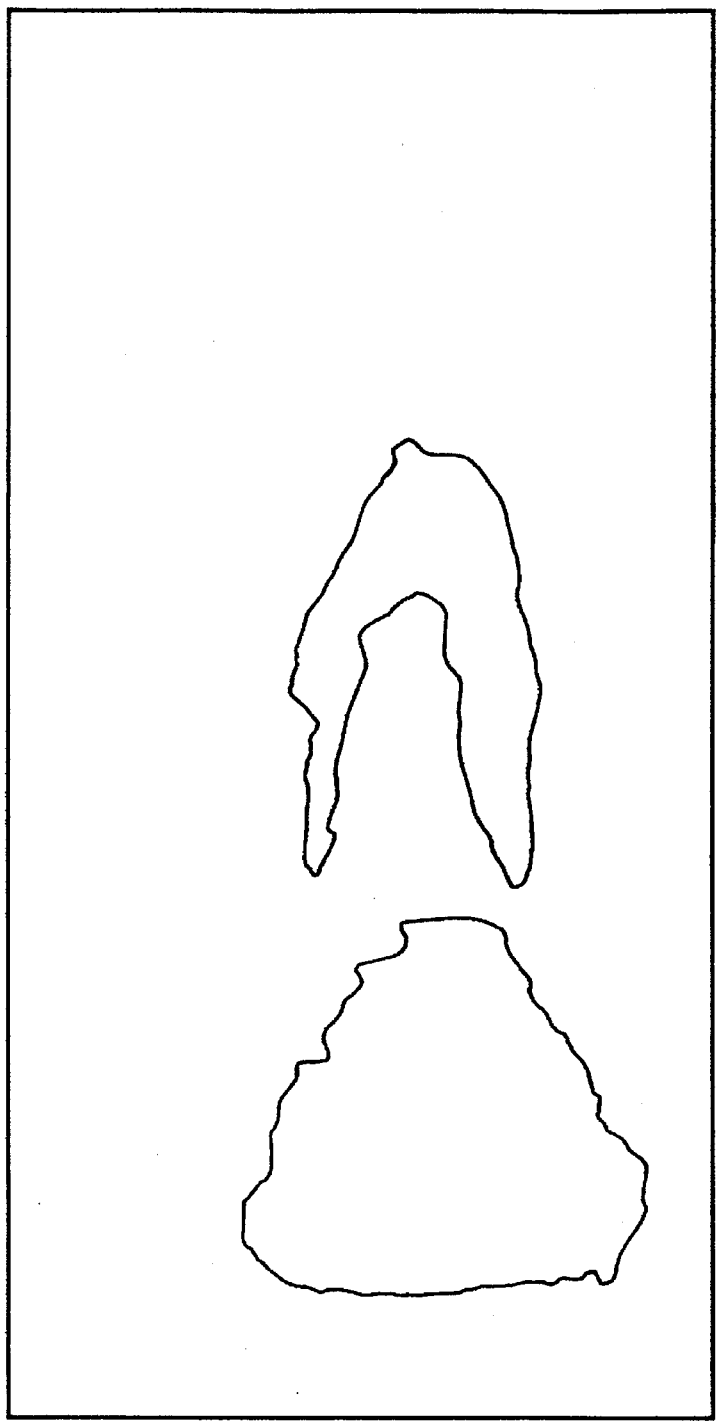
FIG. 15 is a diagram showing an example of a binary-converted image of an object in a normally soldered state.
Figure 16:
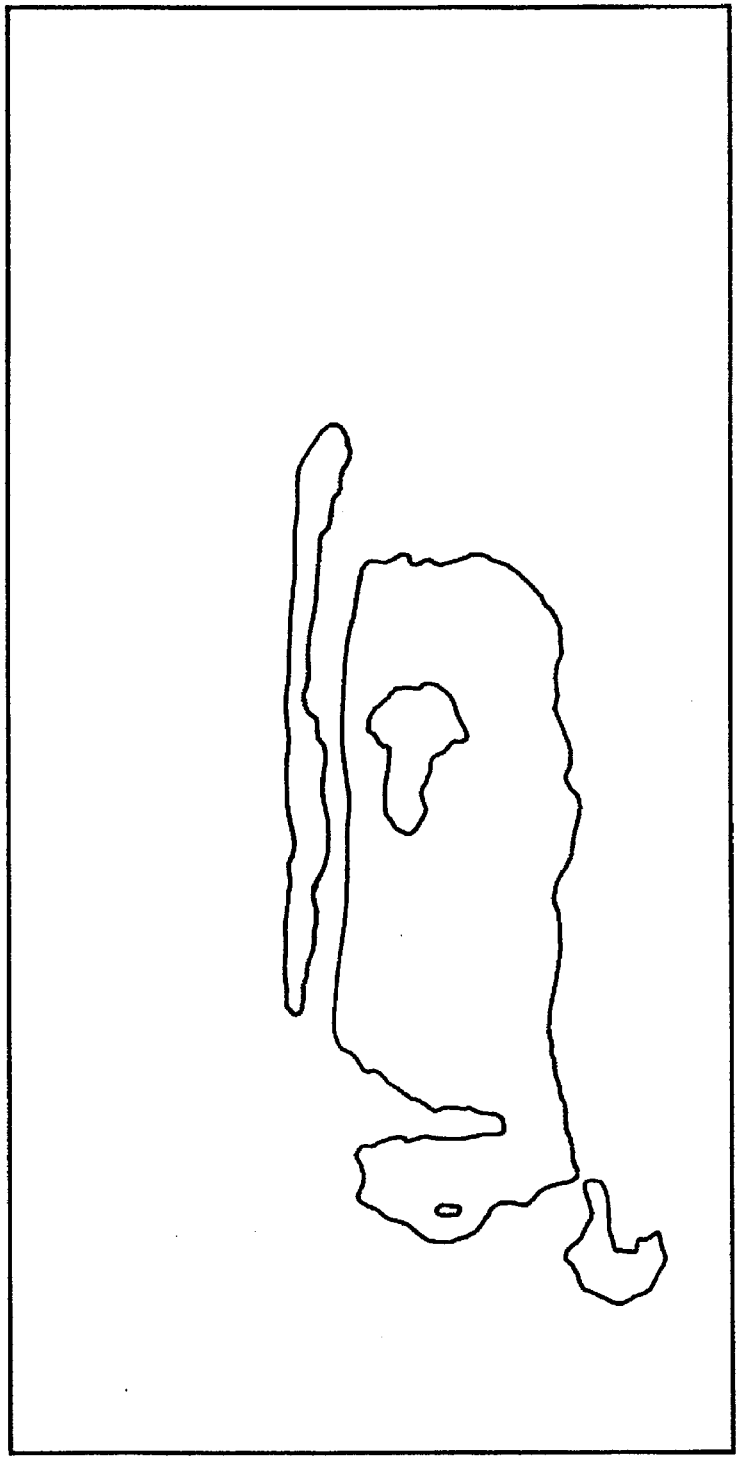
FIG. 16 is a diagram showing an example of a binary-converted image in a case where floating has occurred.
Figure 17:
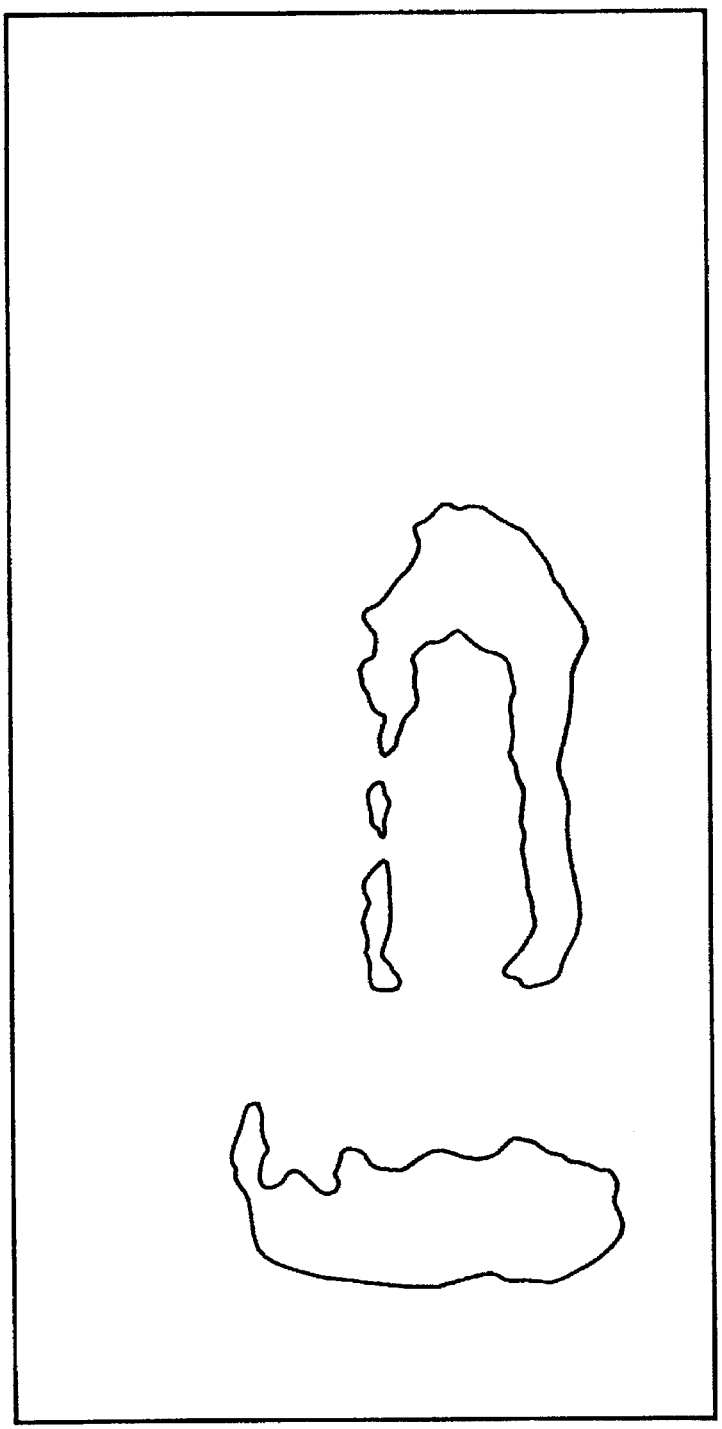
FIG. 17 is a diagram showing an example of a binary-converted image in a case where there is some floating.
Figure 18:
FIG. 18 is a diagram showing an example of a binary-converted image in case of a bridge.
Figure 19:
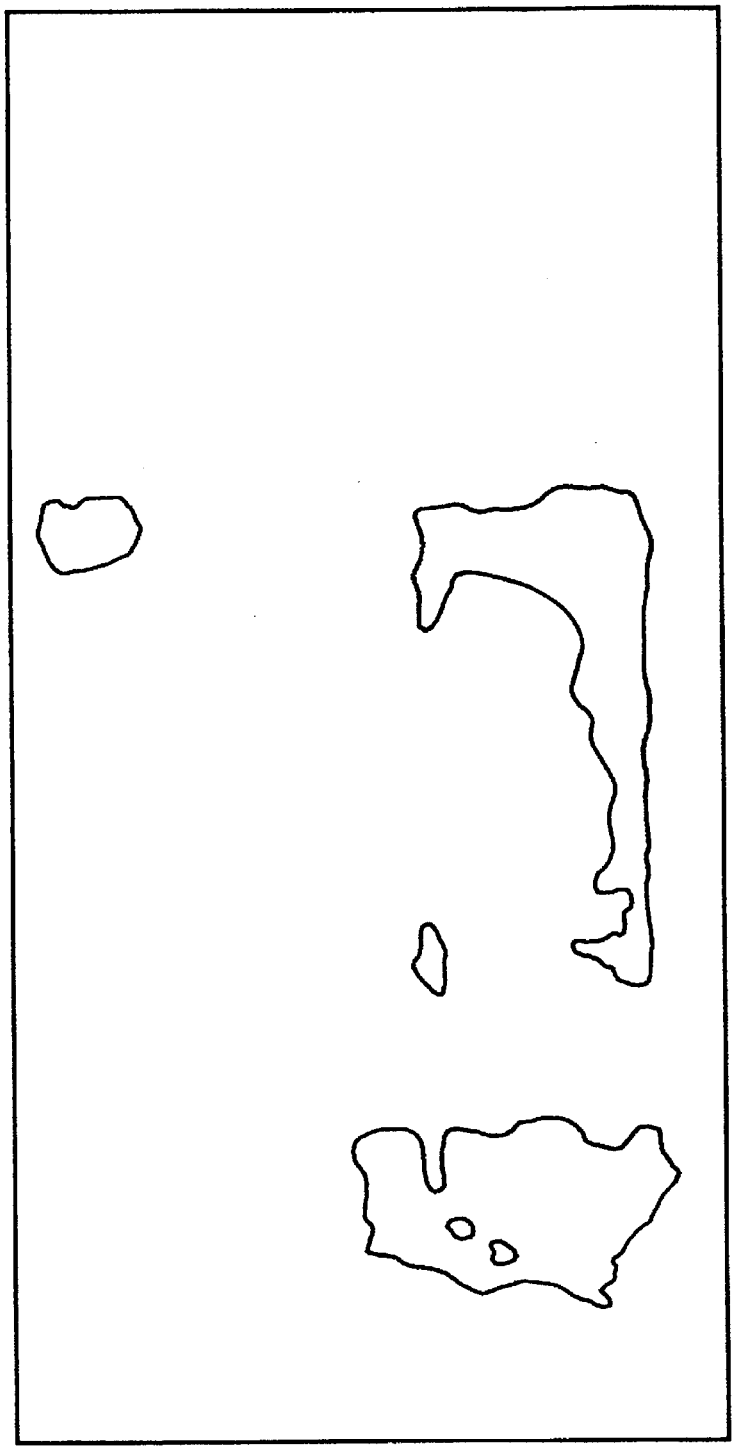
FIG. 19 is a diagram showing an example of a binary-converted image in case of a solder ball.
Figure 20:
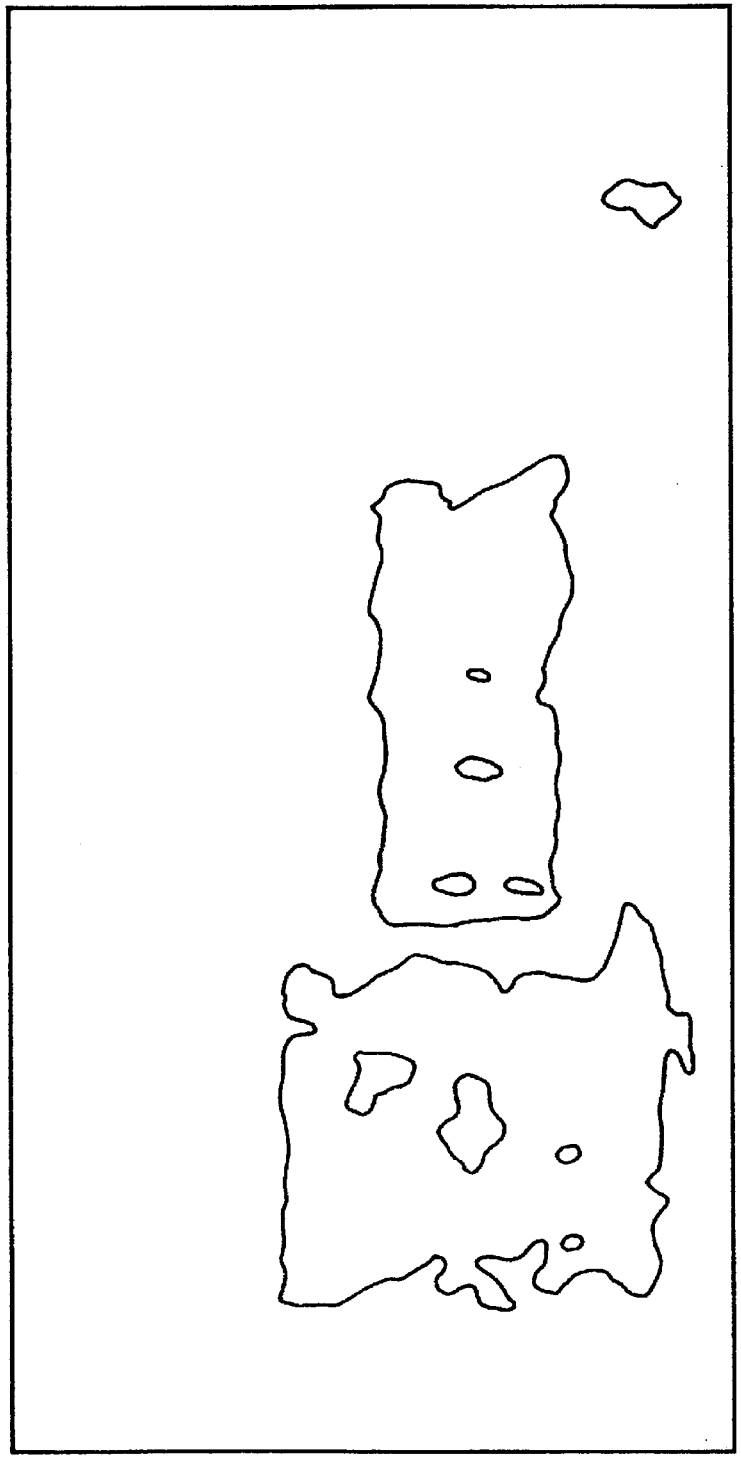
FIG. 20 is a diagram showing an example of a binary-converted image in case of a soldering deficiency.

FIGS. 12 and 13 illustrate which of the 24 characterizing quantities from $F_1$ from $F_{24}$ are computed from respective ones of the binary image data and multivalued image data inputted to the characterizing quantity extracting unit 112. Specifically, as shown in FIG. 12, the characterizing quantities $F_1$ through $F_{18}$ are computed from the binary image regarding each region. As shown in FIG. 13, the characterizing quantities $F_{19}$ through $F_{24}$ are computed from the multivalued image.

The method of computing each characterizing quantity will now be described.

(a) Circumscribed rectangle ($F_1$-$F_4$)

The characterizing quantity "circumscribed rectangle" refers to a rectangle bounded by vertical and horizontal lines passing through the left edge ($X_L$), upper edge ($Y_U$), right edge ($X_R$) and lower edge ($Y_D$) of the region under inspection. This is information necessary when calculating the characterizing quantities below.

(b) Centroid position ($F_5$, $F_6$)

The position of the center of gravity, namely the centroid position, corresponds to the centroid ($X_G$, $Y_G$) of the above-mentioned circumscribed rectangle. The centroid position is information which does not directly participate in size and shape recognition.

(c) Aspect ratio

Aspect ratio is referred to also as vertical/horizontal ratio and is a characterizing quantity long in use since it is effective in performing shape recognition. The aspect ratio is obtained as indicated by the following equation based upon the above-mentioned circumscribed rectangle:

$$\text{Aspect ratio} = |Y_U - Y_D| / |X_R - X_L| \quad (9)$$

(d) X mean length, X maximum length, Y mean length, Y maximum length

Here the region to be inspected is projected upon the coordinate axes, and these characterizing quantities are expressed by the ratio of the mean length $X_{mean}$ ($Y_{mean}$) in the X (Y) direction of the intensity distribution (referred to as the peripheral distribution) to the maximum length $X_{max}$ ($Y_{max}$) in the X (Y) direction of this intensity distribution.

(e) Area

The characterizing quantity "area" corresponds to the total number of pixels in the region to be inspected. This characterizing quantity participates in size but not in shape.

(f) Area density

Area density is a characterizing quantity expressed by the ratio of the area found in (e) to the area of the circumscribed rectangle found in (a).

(g) X-direction offset and Y-direction offset

These characterizing quantities express how much the above-mentioned centroid is offset in the X (Y) direction within the circumscribed rectangle. These are calculated as follows:

$$\frac{|X_G - X_L|}{|X_R - X_L|} \quad (10)$$

$$\frac{|Y_G - Y_U|}{|Y_B - Y_U|} \quad (11)$$

(h) Perimeter

The characterizing quantity "perimeter" is information indicated by the length of the contour of the region.

(i) Size

This is a characterizing quantity indicated by $$2 \times \frac{\text{area}}{\text{perimeter}} \quad (12)$$

based upon the above-mentioned area and perimeter information.

(j) Perimeter-area ratio

This is a characterizing quantity indicated by $$\frac{(\text{perimeter})^2}{\text{area}} \quad (13)$$

based upon the above-mentioned area and perimeter information. This is a characterizing quantity which has long been used.

(k) X-axis peripheral distribution variance, Y-axis peripheral distribution variance These characterizing quantities are indicated by variances with respect to the X and Y axes in a peripheral distribution.

Characterizing quantities shown in FIG. 13 obtained from the multivalued image are as follows:

(l) Mean, variance

"Mean" and "variance" are characterizing quantities indicated by the mean and variance of the shade value of each pixel in the region under inspection.

(m) Bounded variation quantity (BVQ)

"Bounded variation quantity" is defined, by applying the concept of the total variation of a bounded variation function in mathematics, as a characterizing quantity having little computational quantity that reflects the local nature of a pattern. The bounded variation quantity of an array P of a digital shaded image can be calculated as follows:

The direction of computation of a change in change is represented by $\theta$, and an array of numbers of the inspected region whose characterizing quantity is to be computed is represented by PN. The bounded variation quantity of the array P of the digital shaded imaged can be defined as the mean value of the absolute values of the density differences between two mutually adjacent pixels belonging to the same region (a region where PN is the same). A case in which $\theta=0°$ holds will be described. In a case where the two pixels are searched while staggering the region-number array PN one at a time in the horizontal direction, the two pixels will be expressed by $$(I, J-1), (I, J)$$

where I is the pixel position in the X direction and J is the pixel direction in the Y direction. Letting $SD_{j;\theta=0}$ represent the total sum of the absolute values of the differences in shade between two mutually adjacent pixels in a region $j$ when $\theta=0$ holds, we have $$SD_{j;\theta=0} = \sum_{PN} \{|P(I, J-1) - P(I, J)|\} \quad (14)$$

It should be noted that the addition operation for the above-mentioned total sum is performed when $$PN(I, J-1) = PN(I, J) \quad (15)$$

holds, namely only if the mutually adjacent pixels belong to the same region.

Accordingly, letting $D_{j;\theta=0}$ represent the number of times the difference operation carried out in region $j$ is performed, the bounded variation quantity $BVQ_{j;\theta=0}$ in the $\theta=0°$ direction is computed based upon:

$$BVQ_{j;\theta=0} = \frac{SD_{j;\theta=0}}{D_{j;\theta=0}} \quad (16)$$

for every region $j$ after the end of processing for the entire image frame.

Also when the direction $\theta$ in which two pixels adjoin each other is $\theta=45°$, $90°$ and $135°$, the same computation is carried out with only the direction in which PN is searched changing in the $\theta$ direction.

The above-described processing from image input (step S1 in FIG. 2) to characterizing quantity extraction (step S5) is repeated for all leads of the IC. The image input operation of step S1 is carried out with regard to FIG. 4B, the foregoing processing is repeated for all IC leads in FIG. 4A to extract the characterizing quantities, and these are preserved in memory (step S6 in FIG. 2).

The foregoing is processing carried out by the characterizing quantity extracting unit 112.

Matching of the characterizing quantities, which are obtained as set forth above, with reference patterns is carried out by the two arithmetic units 113, 114, thereby determining to which reference pattern an input pattern belongs. There are eight types of reference patterns used in the present embodiment. These are as follows:

(1) a normal pattern (for leads)

(2) a normal pattern (for soldered portions);

(3) a pattern indicating floating of a lead;

(4) a pattern indicating some floating of a lead;

(5) a pattern indicating a bridge between leads;

(6) a pattern indicating that solder is in the form of a ball;

(7) a pattern indicating a shortage of solder (for leads); and (8) a pattern indicting shortage of solder (for soldered portions).

FIGS. 15 through 20 illustrate examples of binary-coded images for a normal case, a case in which floating has occurred, a case in which some floating has occurred, a case in which a bridge has formed, a case where a solder ball has formed, and a case in which there is a shortage of solder, respectively.

Data indicative of these eight types of reference patterns are formed in the following manner: A typical sample obtained experimentally with regard to each pattern is called, image processing (averaging, noise removal, etc.) similar to that described above is applied to these samples, the characterizing quantities ($F_1$–$F_{24}$) obtained with regard to each of the samples are entered from the reference pattern generator 115 as reference pattern vectors, and these quantities are stored as internal knowledge.

Here the reference vectors can be numerical values obtained statistically from a plurality of samples, or numerical values obtained from a single typical sample most desired to be matched.

Steps S7, S8

Figure 25:
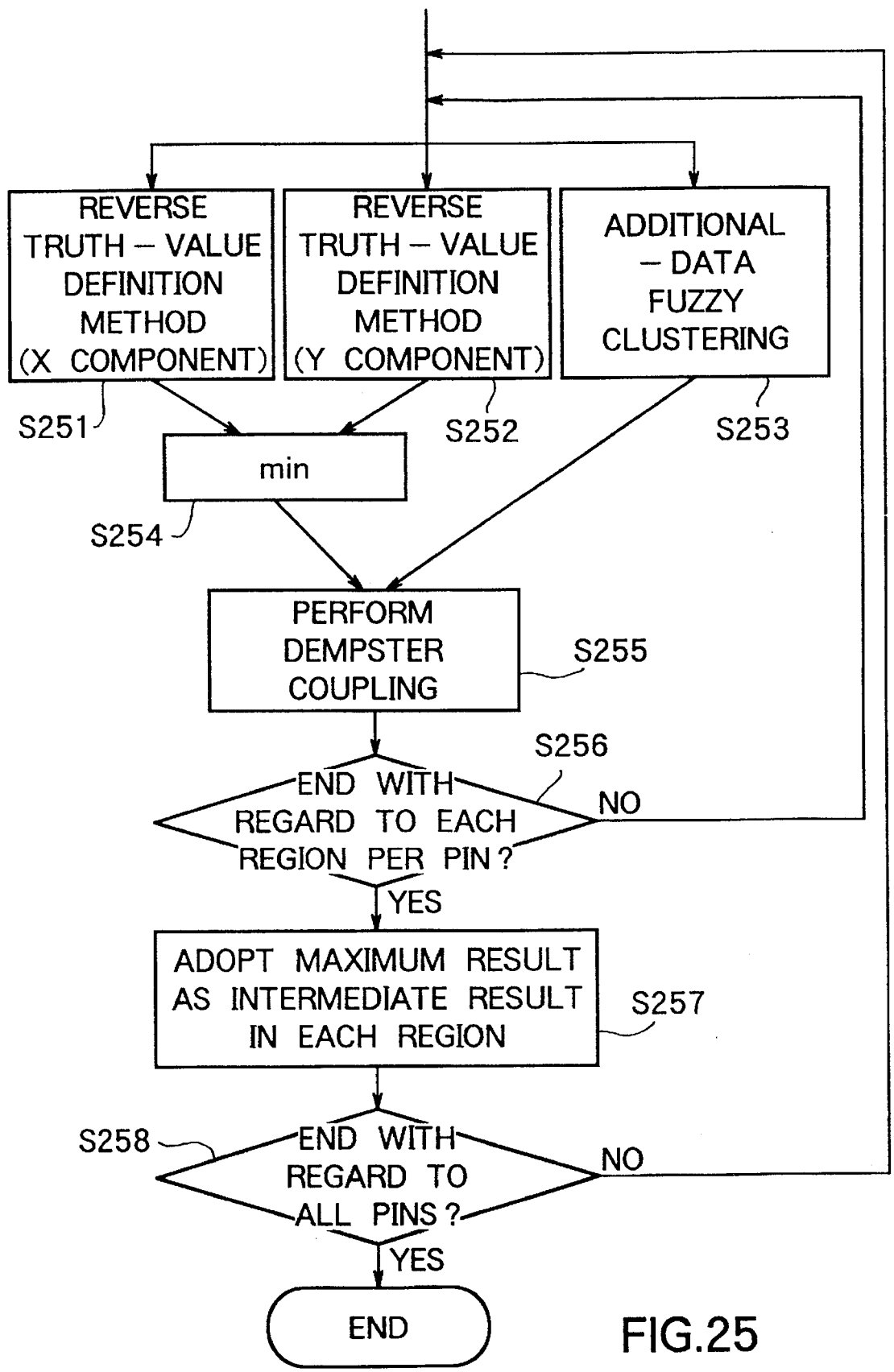
FIG. 25 is a flowchart of Dempster coupling.

The fuzzy clustering arithmetic unit 114 applies an additional-data fuzzy clustering method with regard to the characterizing quantities extracted by the characterizing quantity extracting unit 112, namely with regard to the characterizing quantities ($F_7$–$F_{18}$) relating to shape and the characterizing quantities ($F_{19}$–$F_{24}$) relating to brightness, and "first evidence" regarding which state an input image belongs to is computed. The arithmetic unit 113 for the reverse truth-value definition method applies a reverse truth-value definition method with regard to the "position" characterizing quantity, and "second evidence" is computed. Steps S7, S8 in FIG. 2 indicate these two computation processes. The detailed procedures of step S7 and S8 are indicated at steps S251 through S254 in FIG. 25.

The fuzzy clustering method and reverse truth-value definition method carried out by these two arithmetic units will be described in order.

Fuzzy Clustering Method

The algorithm for the additional-data fuzzy clustering method performed by the arithmetic unit 114 will now be described.

In the field of pattern recognition without an instructor, use is made of a clustering technique for deciding to which predetermined cluster the data vectors of respective data sets, which are to be dealt with, belong. According to the definition of clustering, a set of given multidimensional data are divided into a designated arbitrary number of clusters by gathering "similar" items of data into the same cluster based upon the structure of this data set. One cluster is a single partial set within a given data set, and division refers to forming a family of clusters. Each item of data is characterized in that it reverts to only one cluster among the cluster divisions.

However, since pattern recognition is based upon what is seen and heard by the human being making the recognition, complicated factors are relevant, such as the subjectivity and individual character of the particular human being. In other words, the nature of what is to be recognized possesses ambiguity which cannot be described merely by two values, i.e., true and false. Such ambiguity generally is of a fairly complex nature rich in diversity.

Thus, in fields where the participation of human judgment is required, there are many cases in which a satisfactory description cannot be rendered merely by a binary evaluation using {0,1}, and consideration has been given to a theory of {0,1} multivalued evaluation which positively takes intermediate ambiguous states into account. Fuzzy clustering involves introducing this concept of "0,1" multivalued evaluation into clustering.

Here n-number of objects for classification (hereinafter referred to as "individuals") are represented by $$E=\{o_1, o_2 \ldots, o_i \ldots o_n\}$$

or by $$\{1, 2, \ldots, i, \ldots, n\} \quad (17)$$

A p-variable observation vector of an i-th individual is represented by $$X_i=(x_{i1}, x_{i2}, \ldots, x_{il}, \ldots, x_{ip})$$

and the entirety of a multivariate data matrix is written as follows:

$$X=(X_1, X_2, \ldots, X_i, \ldots, X_n) \quad (18)$$

It will be assumed that a set E of individuals is suitably divided and that c-number of clusters (namely a fuzzy partial set) which are mutually exclusive and not vacant are given. This is represented by the following:

$$\tilde{\Gamma}=\{\zeta_1, \zeta_2, \ldots, \zeta_j, \ldots, \zeta_c\} \quad (19)$$

With respect to the c-number of divisions expressed by Eq. (19), the degree to which each individual belongs to each cluster is represented by the following matrix:

$$U=(u_{ji}) \quad (20)$$

(where, j=1, 2, . . . , c; i=1, 2, . . . , n)

Here we have the following:

$$u_{ji} \in [0, 1], \quad (21)$$

$$\sum_{i=1}^{c} u_{ji} = 1 \quad (22)$$

In other words, $u_{ji}$ is a membership function in fuzzy theory and indicates the degree to which an individual i belongs to a cluster $\tilde{s}_j$. At this time optimization of the following function will be considered:

$$J_P(U, v) = \sum_{i=1}^{n} \sum_{j=1}^{c} (u_{ji})^p \|x_i - v_j\|^2 \quad (23)$$

$$(1 \leq p \leq \infty)$$

With respect to $1<p<\infty$, we have $$u_{j,i} = \frac{1}{\sum_{k=1}^{c} \left\{ \frac{\|x_i - v_j\|^2}{\|x_i - v_k\|^2} \right\}^{1/(p-1)}} \quad (24)$$

$$v_j = \frac{\sum_{i=1}^{n} (u_{ji})^p \cdot x_i}{\sum_{i=1}^{n} (u_{ji})^p} \quad (25)$$

The $v_j$ in Eq. (25) is the mean vector of cluster $\tilde{s}_j$. Considering the fact that the following hold:

$$p=1,$$

$$u_{ji} \in \{0,1\}$$

the method is the so-called ordinary k-means method, and $J_1$ is the square-sum reference itself. Giving a weighting coefficient which optimizes $J_p$ in Eq. (23) with respect to p=1,2 by the form of Eqs. (24), (25) makes it possible to use Lagrange's method of indeterminate coefficients as a typical extremal problem. An algorithm for expanding this to the general p can be summarized as follows:

Step I

The number c of clusters and the power exponent are set. The initial condition $U^{(o)}$ of U is suitably given, and the number of times L of repetition is taken as being equal to zero (i.e., L=0).

Step II

The mean vector $v_j^{(L)}$ (j=1, 2, . . . , c) is computed in accordance with Eq. (25).

Step III $U^{(L)}$ is updated in accordance with Eq. (24).

Step IV

If an appropriate convergence criterion value $\epsilon$ is given and $$|U^{(L+1)} - U^{(L)}| \leq \epsilon$$

holds, computation is terminated; otherwise, the operation L=L+1 is performed and a return is effected to Step II.

In a case where the fuzzy k-means method is applied to the image data, a drawback is that classification of data sets of similar patterns cannot readily be performed. Another disadvantage is that isolated data (i.e., a cluster having few items of contained data) is included in another cluster (i.e., a cluster containing a large number of items of data). In order to effect an improvement, a method has been proposed in which a reference pattern vector $s_j$ is introduced into Eq. (23) and the following Eq. (26) is adopted as an objective function:

$$J_P(U, v) = \sum_{i=1}^{n} \sum_{j=1}^{c} (u_{ji})^p \{(1 - g_j) \cdot \|x_i - v_j\|^2 + g_j \cdot \|x_i - s_j\|^2\} \quad (26)$$

$(1 \leq p \leq \infty)$

It should be noted that at $g_j \in [0,1]$, $g_j \in (0,1)$ in a case where $s_j$ is given $g_j \in 0$ in a case where $s_j$ is not given  (27)

In FIG. (27), [] indicates a closed interval and () indicates an open interval.

Several vectors which are capable of typifying a pattern (cluster) desired to be classified in advance shall be given as $\{s_j\}$. Making an input pattern typify $\{s_j\}$ can be considered as one type of pattern matching. If this technique is compared with the Pedrycz technique, it will be seen that the technique of this embodiment is advantageous in that it will suffice to provide only c-number of clusters even if there are many $s_j$, and in that only a small number of given items of data will suffice.

Further, in Eq. (26), there are the two terms $(u_{ji})^p \cdot (1-g_j) \cdot \|x_i-v_j\|^2$ $(u_{ji})^p \cdot g_j \cdot \|x_i-s_j\|^2$ The first term can be considered to be clustering by the fuzzy k-means method related to the cluster $\tilde{s}_j$, and the second term can be considered clustering by one type of matching for a case where $s_j$ has been given. Accordingly, $g_j$ can be considered to be a parameter which represents the degree of contribution of these two clusterings. Specifically, in a case where $g_j=0$ holds, Eq. (26) becomes only one term, and the technique of this embodiment is the same as the fuzzy k-means method. In a case where $g_j=1$ holds, the clustering is that in accordance with the distance from $s_j$ to each item of data $x_i$. If $g_j=\frac{1}{2}$ holds, the weighting of both clusterings becomes equal.

The degree to which the individual i belongs to a cluster is known by the element $u_{ji}$ of the finally obtained U. If the method is the ordinary k-means method, all that can be known is whether a certain individual i belongs to $S_j$ ($u_{ji}=1$) or does not belong thereto ($u_{ji}=0$) with regard to the cluster set $\Gamma=\{S_1, S_2, \ldots, S_j, \ldots, S_c\}$ obtained by this method. However, according to the method of this embodiment, the degree of membership in each cluster can be determined.

In the present simulation, p=1.3, c=8, n=87 and $g_j=0.9$ in Eq. (6).

Figure 21:
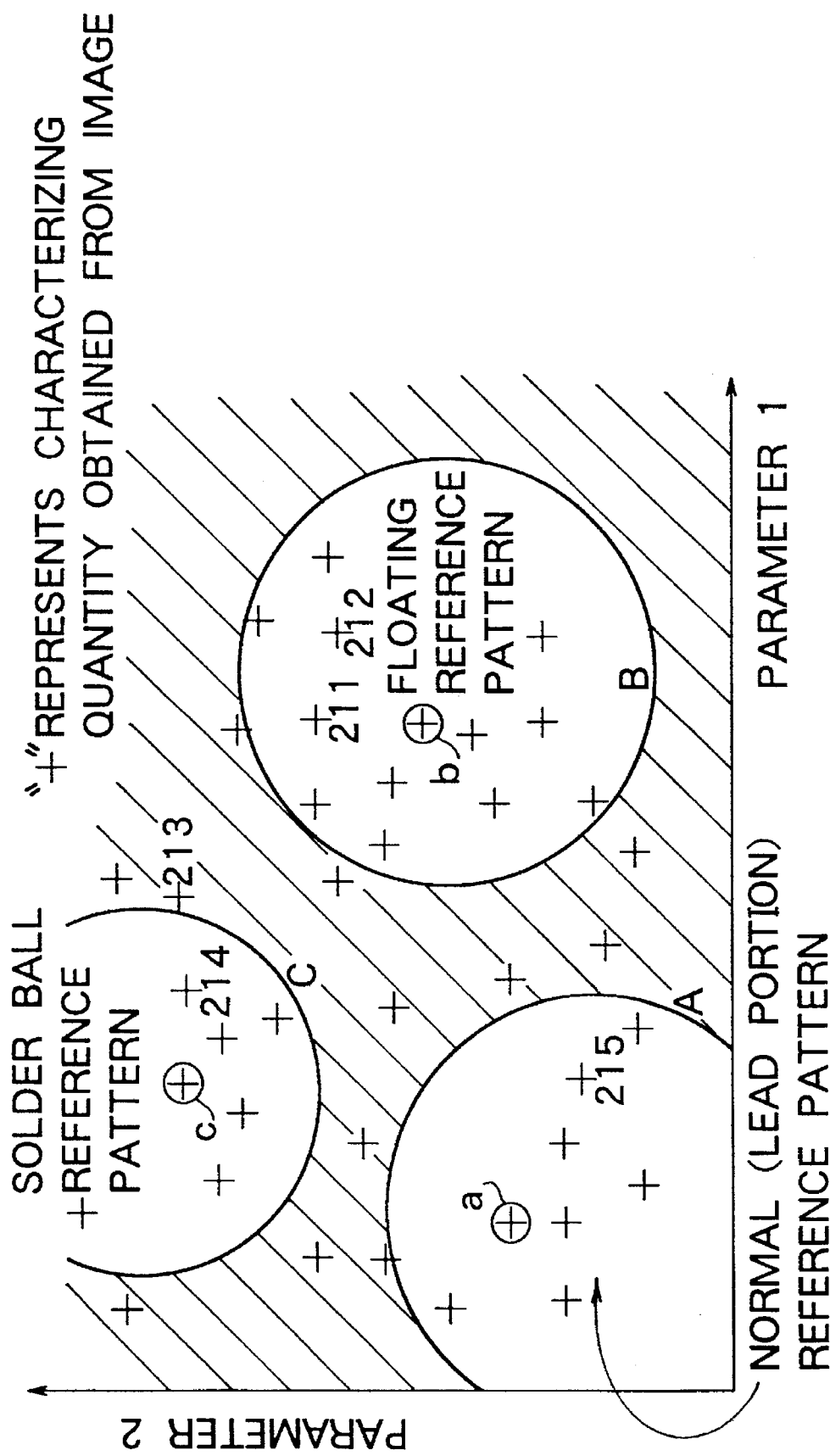
FIG. 21 is a diagram showing the principle of fuzzy clustering.

FIG. 21 schematically illustrates the principle of the additional fuzzy-data clustering method. For the sake of convenience, two parameters (two dimensions) are adopted in FIG. 21, although there are 18 parameters (18 dimensions) in actuality.

In additional fuzzy-data clustering, characterizing quantities obtained by applying image processing to images relating to a plurality of lead wires are processed simultaneously. As a result, the same effect is obtained as when clustering processing for collecting similar patterns and processing for carrying out matching with reference patterns are executed simultaneously. With the conventional clustering method (hard clustering), all that can be done is to include a certain item of data in any one cluster without fail. With fuzzy clustering, however, the degree to which the data is included in each of a plurality of clusters can be expressed. Accordingly, even if a correct judgment cannot be made merely by clustering processing, the making of an erroneous judgment is eliminated by leaving ambiguity. When a correct judgement subsequently becomes necessary, it will suffice to make the judgment by taking other information into consideration.

In FIG. 21 which for describing the principle of the additional fuzzy-data clustering method, a, b and c indicate characterizing quantities based upon reference patterns for states where a soldered joint is normal (for a lead portion), exhibits the occurrence of floating and exhibits the occurrence of a solder ball, respectively. In addition, the + symbols indicate characterizing quantities obtained from input image data regarding an IC under inspection. The large circles shown at A, B and C each illustrate cluster results in conventional clustering.

In conventional clustering, the characterizing quantities 211, 212 belong to cluster B indicative of "floating", 213 does not belong to any cluster, 214 belongs to cluster C indicative of "solder ball", and 215 belongs to cluster A indicative of "normal". Thus, in conventional clustering, to which cluster a certain characterizing quantity belongs or does not belong is uniquely decided.

By contrast, in accordance with the fuzzy clustering of the present invention, not only does characterizing quantity 212, for example, belong to B, but by taking into consideration also the degree of membership in A, C and leaving ambiguity, inspection accuracy can be enhanced by making a judgment with the inclusion of other information.

Reverse Truth-Value Definition Method

The reverse truth-value definition method is applied with regard to characterizing quantities ($F_1$–$F_6$) relating to position in the arithmetic unit 113, and the "second evidence" relating to the above-mentioned reference patterns (1)–(8) is computed.

More specifically, as shown in FIG. 22A, position information is represented by a fuzzy set, and matching between reference patterns and the fuzzy set is carried out. The method of performing matching employs the reverse truth-value definition method based upon numerical truth values. In FIG. 22A, the dashed line indicates a fuzzy set with respect to a reference pattern, and the solid line indicates a fuzzy set of an actual object to be inspected.

The reverse truth-value definition method will now be described in simple terms. When P, Q are fuzzy sets and the numerical truth value of the proposition "X is P" is t, the Q that satisfies the following Eq. (28) is obtained by truth-value definition:

("X is P" is t)=(X is Q)  (28)

Conversely, when P and Q have been given, t is estimated by the reverse truth-value definition method. Here t is expressed by the following equation:

$$t = \frac{Sup(P \cap Q) + Inf(P \cup Q)}{2} \quad (29)$$

where Sup signifies the maximum value of a membership function and Inf the minimum value of the membership function. Further, P, Q are assumed to be normal, convex. $\neg Q$ is the inverse of the set Q. In addition, t has the linguistic meanings of the kind shown in FIG. 22B.

In Eq. (28), "P" corresponds to a reference pattern. This reference pattern P is a membership function generated in the same manner as the reference pattern in the above-mentioned fuzzy clustering method. Further, "Q" is a membership function generated from position information, as described in connection with FIG. 22. Accordingly, what Eq. (28) means is that the certainty with which the object X of matching may be matched with the reference pattern P is equivalent to matching X with B.

Figure 23:
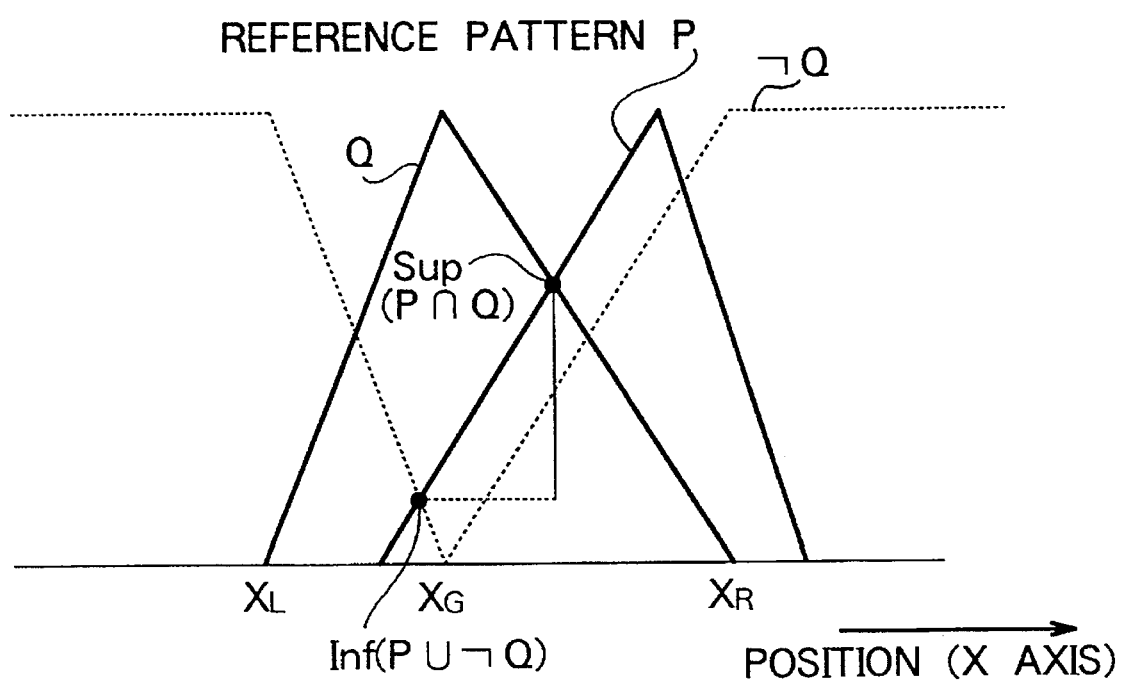
FIG. 23 is a diagram for describing a specific example of application of a reverse truth-value definition method.

FIG. 23 illustrates Eq. (29) in diagrammatic form. This diagram shows only the X axis in order to simplify the description. In FIG. 23, $X_L$, $X_R$ are the left and right extremities of a characteristic quantity "circumscribed polygon". The dashed line $\_Q$ is obtained by inverting the set Q. Sup(P∩Q) is the maximum value of the product set of sets P and Q, and Inf(P∪$\_$Q) is the minimum value of the sum set of sets P and Q. Accordingly, t is the mean value of the aforementioned maximum and minimum values.

The result t of the reverse truth-value definition method has two direction components, namely a 2×-direction component and a Y-direction component. In steps S251 and S252 of FIG. 25, the result has a component $t_x$ relating to the X direction in the two-dimensional plane and a component $y_x$ relating to the Y direction. Accordingly, at step S254, a product is calculated and the smaller of the values $t_x$, $t_y$, namely $$t = \min(t_x, t_y) \quad (30)$$

is used as the final result.

The reason for using the reverse truth-value definition method for the characterizing quantities ($F_1$–$F_6$) relating to position will now be described.

Figure 3A:
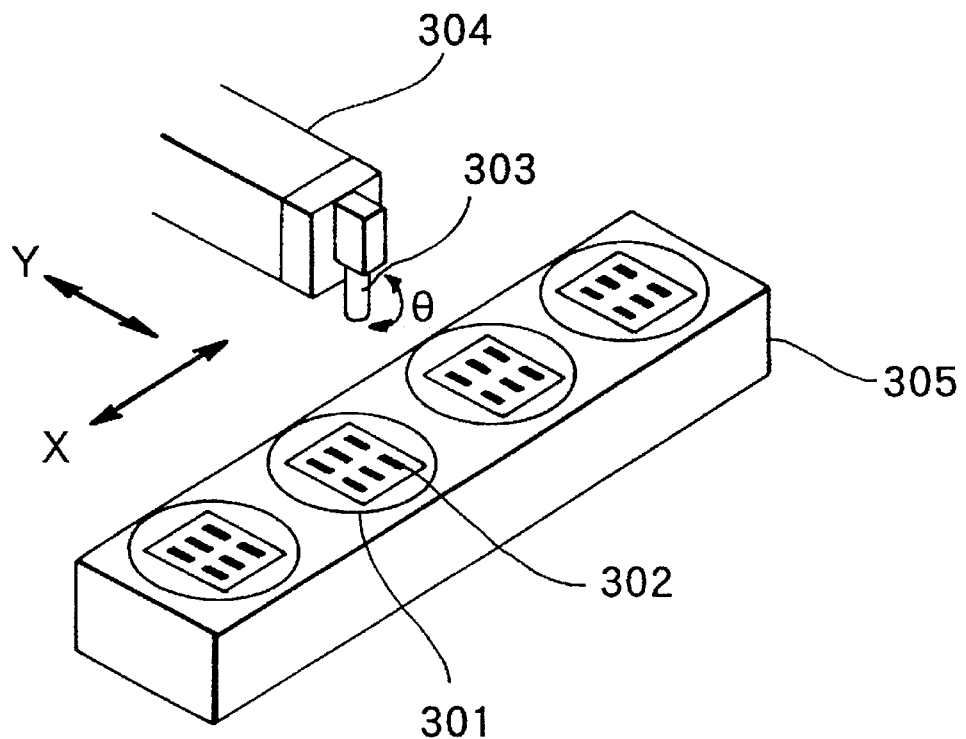
FIGS. 3A and 3B are external views of the inspection apparatus.
Figure 3B:
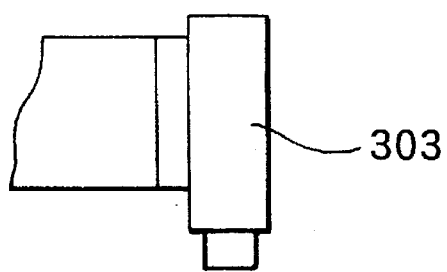
Figure 24:
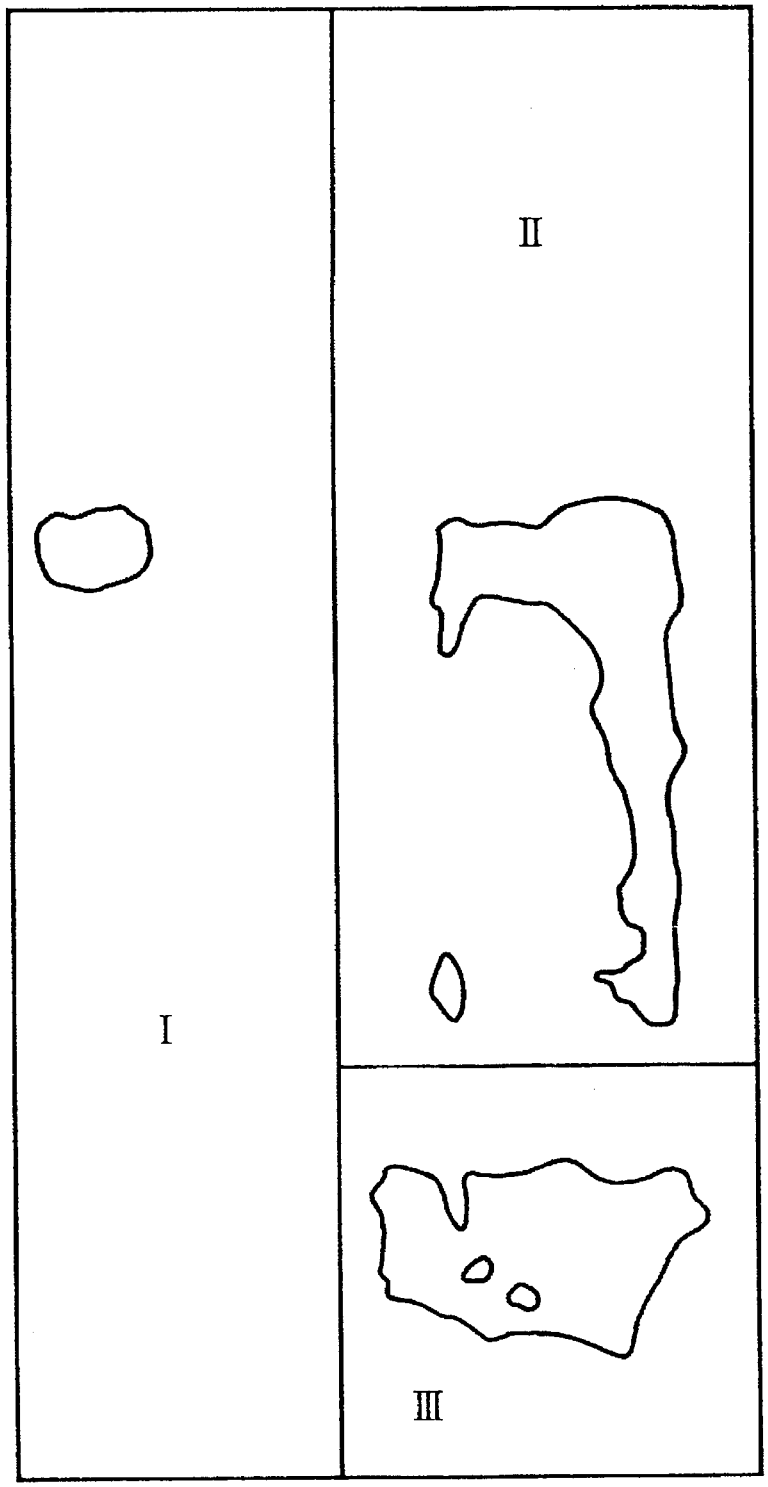
FIG. 24 is a diagram showing extracted regions.

The positional relationship between the image input device and the IC under inspection as shown in FIG. 3A is so arranged that, in terms of the image, the lead wire comes to occupy region II while the solder comes to occupy region III in FIG. 24. Accordingly, in a case where the image presumed to be solder occupies region I, this should result in a defect such as the occurrence of a bridge or a solder ball. However, since these defects have arbitrariness with regard to the positions at which they occur, classification by the clustering method is difficult. The reason for this is as follows: Though articles which do not exhibit a bridge or solder ball are normal and these defects are not detected in the majority of cases, where these defects are located when they do occur is uncertain. In addition, since lead terminals and solder exhibit some positional displacement, it is preferable to adopt a method capable of allowing this positional displacement. Consequently, in the present method, the reverse truth-value definition method is used instead of additional-data fuzzy clustering as the position matching method.

Step S9

With reference again to FIG. 2, step S9 (or step S255 in FIG. 25) calls for the matching results of additional-data fuzzy clustering and the matching results of the reverse truth-value definition method to be coupled using the Dempster coupling rule, with these results being regarded mutually independent probability events.

The equation for this computation is expressed by the following:

$$m(Ak) = \frac{\sum_{A1i \cap A2j = Ak} m_1(A_{1i}) \cdot m_2(A_{2j})}{1 - \sum_{A1i \cap A2j = \phi} m_1(A_{1j}) m_2(A_{2j})} \quad (31)$$

$(A_k \neq \phi)$

In this equation, $m_1(A_{1i})$ (i=1, 2, . . . , 8) is the result of additional-data fuzzy clustering relating to the i-th reference pattern, $m_2(A_{2j})$ (j=1, 2, . . . , 8) is the result of the reverse truth-value definition method relating to the j-th reference pattern, and $m(A_k)$ (k=1, 2, . . . , 8) is the result obtained by coupling.

The numerator signifies that the product of the respective basic probabilities is assigned to the product set $A_k$ of $A_{1i}$ and $A_{2j}$. In the denominator, there are cases where product set of $A_{1i}$ and $A_{2j}$ is an open set if conflicting arguments are coupled. Therefore, these are excluded and normalization is carried out. In case of more than two basic probabilities, these are realized by successively applying Eq. (31) if they are obtained from independent evidence.

The processing of steps S7, S8, S9 (or steps S251–S255 in FIG. 25) must be executed with regard to all regions extracted at step S4 for the image of one pin of the IC (e.g., see FIG. 24). Accordingly, at step S256 in FIG. 25, it is decided whether the foregoing processing has been performed with regard to all of these regions.

FIG. 26 illustrates an example the results of processing regarding one pixel (one pin). The example of FIG. 26 illustrates the results of applying the processing of step S255 to each region in a case where 12 regions (four regions of group 1, four regions of group 2 and four regions of group 3) are extracted with regard to one pin. In each of the regions, Dempster coupling results relating to eight types of reference patterns are obtained.

If processing has been executed with regard to all regions of one pin, then what corresponds to the maximum evaluated value among the evaluated values obtained is given an intermediate evaluation of soldered state regarding one pin. For example, with regard to floating, the results of the region groups 1, 2, 3 are 0.13, 0.634, 0.001, respectively. Hence, the result is that the maximum value 0.634=63.4%. This result means that the possibility of floating is evaluated at 63.4% and the possibility of some floating is evaluated at 30.4%.

The foregoing processing is executed with regard to all pins (step S258).

Step S10

The final decision as to whether the soldering of a circuit board is acceptable or not is made at step S10 (FIG. 2). That is, with regard to the evaluation of every pin, the particular pin is evaluated as being faulty if the maximum value of the possibility of each of the six fault items "floating", "some floating", "bridge", "solder ball" and "shortage (lead portion)" is greater than 60% in the results of evaluation.

The circuit board is judged to be faulty if at least one pin among the total number of pins is judged to be faulty.

In case of an in-line system, a circuit board judged to be faulty is ejected from the line by sorting means or an alarm is given by a lamp or buzzer.

The final handling of data is not limited to the above-described system. For example, an arrangement can be adopted in which basically the "normal (lead portion)" data and "normal (soldered portion)" data are used preferentially in evaluation, with a circuit board being treated as being faulty if at least one fault item shows a value so greater than 60%.

Advantages of the Embodiment

The specific advantages of the inspection apparatus of the foregoing embodiment will now be described.

According to conventional (binary) clustering (the k-means method), all that can be judged is whether an object under inspection belongs or does not belong to a certain cluster; an ambiguous judgment as to the degree of belonging is not allowed. Accordingly, data in an intermediate state must forcibly be made to belong to one of the clusters. As a consequence, erroneous recognition occurs and a flexible evaluation cannot be carried out.

On the other hand, in the present embodiment, fuzzy clustering is used, and use is made of the reverse truth-value definition method and the Dempster coupling rule in order to combine these. As a result, the following advantages can be obtained:

A1: Erroneous decisions are reduced

In comparison with a case where hard clustering is carried out, fuzzy clustering in accordance with the present embodiment greatly enhances decision accuracy.

Further, an output in accordance with the reverse truth-value definition method and an output in accordance with additional-data fuzzy clustering are coupled using the Dempster coupling rule, thereby providing a reliability higher than that obtainable with either of these methods singly.

A2: Flexible evaluation is possible

With hard clustering, owing to the {0,1} evaluation, all that can be determined is whether there is or is not a shortage of solder, by way of example. With fuzzy processing, however, the extent of the solder shortage can be determined and a certain latitude is allowed in subsequent processing.

A3: Ambiguity can be set freely

The ambiguity of clustering can be set by changing the value of p in Eq. (26). Specifically, the degree of ambiguity can be made large by enlarging p, by way of example.

In order to perform clustering, first the initial condition $U^{(0)}$ must be given. The result of clustering changed depending upon the way in which the initial condition is given. In particular, this tendency becomes more pronounced in the case of hard clustering. With fuzzy clustering, however, first p is enlarged to effect a classification into ambiguity, then p is reduced to perform a reclassification, thereby providing a result which is completely unaffected by a difference in initial conditions.

Modification

The present invention can be modified in various ways without departing from the scope of the invention.

Figure 27:
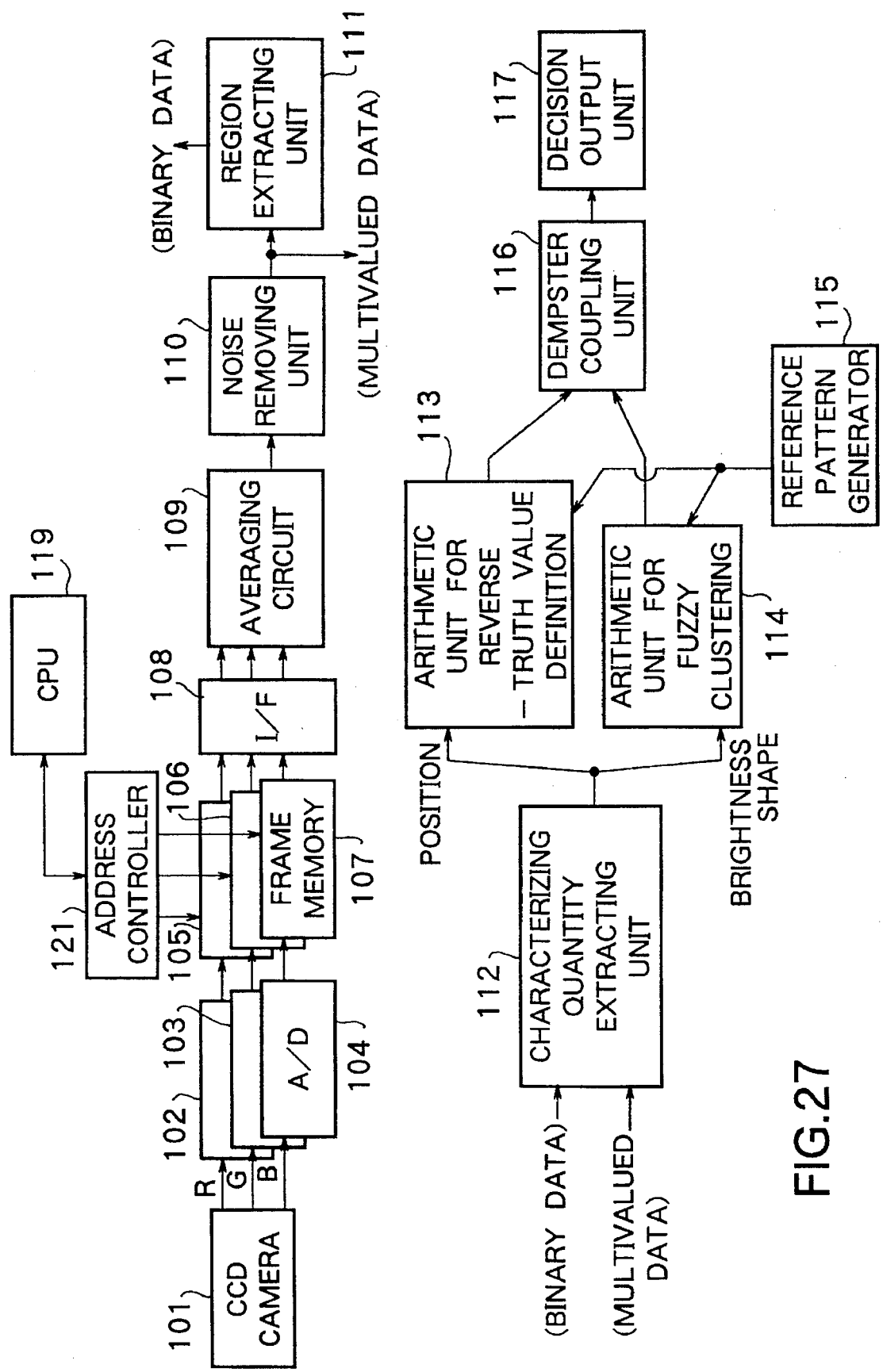
FIG. 27 is a block diagram showing the construction of an apparatus for inspecting the mounting of parts on a circuit board according to an example of a modification of the invention.

FIG. 27 is a block diagram illustrating the construction of such a modification. Though the basic components are similar to those of the above-described embodiment, this embodiment does not possess means for moving and rotating the CCD camera 101, read image data relating to the entirety of the IC are stored in the frame memories 105–107, and addresses for read out from the frame memories 105–107 are controlled by the CPU 119, thereby making it possible to judge every pin of the IC.

In accordance with this modification, means for moving and rotating the CCD camera or a table carrying the circuit board is unnecessary, and the construction of the overall apparatus can be simplified.

The present invention can be altered to a form different from that of the foregoing embodiment (FIG. 1) and modification (FIG. 27).

For example, in the embodiment of FIG. 1, the CCD camera is moved and rotated to input an image of all IC leads of one circuit board. However, an arrangement can be adopted in which the table 301 carrying the circuit board 302 in FIG. 3A is an X-Y table and the table is moved and rotated by a motor.

The above-mentioned input means is not limited to a CCD camera (an area sensor). A CCD line sensor, photomultiplier, etc., can also be used.

Evaluation means, such as fuzzy logic, other than the reverse truth-value method can be used to evaluate position information.

In addition, rather than using the Dempster coupling rule to couple the aforementioned two evaluation means (fuzzy clustering and the reverse truth-value method), another coupling method can be employed, such as by taking a weighted mean, maximum value or minimum value of these two evaluation means.

Further, the characterizing quantities also are not limited to position information, shape information and brightness information. It goes without saying that other characterizing quantities also can be extracted, such as color information (such as hue and saturation) and dot disposition information.

The algorithm of the present invention is not limited to inspection of soldered state as in the foregoing embodiment. By way of example, the algorithm is applicable to all types of evaluation that depends upon the characterizing quantities of an image, such as image pattern matching, image separation, etc.

The present invention is not limited to the above embodiments and various changes and modifications can be made within the spirit and scope of the present invention. Therefore, to apprise the public of the scope of the present invention the following claims are made.

What is claimed is:

1. An inspection apparatus for inspecting a surface state of an object comprising:

reading means for reading said surface of said object and generating multivalued image data for each pixel representing gradation information of said object;

binarizing means for binarizing the multivalued image data read for each pixel by said reading means into binary data for each pixel;

first evaluating means for evaluating the surface of said object in accordance with a first characterizing quantity relating to distribution of brightness based on the multivalued image data which represents gradation information read by said reading means and which is not binarized by said binarizing means and outputting a first evaluation result, said multivalued image data representing a multivalued image of a first tonality characteristic;

second evaluating means for evaluating the surface of said object in accordance with a second characterizing quantity relating to position information based on the binary data binarized by said binarizing means and outputting a second evaluation result, said binary image data representing a binary image of a second tonality characteristic different from said first tonality characteristic; and third evaluating means for evaluating the surface of said object in accordance with both the first and second evaluation results, and outputting an inspection result.

2. The apparatus according to claim 1, wherein said reading means comprises a CCD sensor.

3. The apparatus according to claim 1, further comprising noise removal means for removing noises included in multivalued image data read by said reading means.

4. The apparatus according to claim 1, wherein said first and second characterizing quantities include at least one of position information, shape information and brightness information.

5. The apparatus according to claim 1, wherein said first and second evaluating means evaluate the status of said object on the basis of plural results of evaluations performed in accordance with a plurality of methods employing different principles.

6. The apparatus according to claim 5, wherein said plurality of methods include at least one of a reverse truth-value definition method and a fuzzy clustering method.

7. The apparatus according to claim 1, wherein said inspection apparatus inspects a soldered substrate board which is the object, and said evaluating means evaluates a soldered state of the substrate board.

* * * * *

UNITED STATES PATENT AND TRADEMARK OFFICE
CERTIFICATE OF CORRECTION

PATENT NO.     : 5,638,460
DATED          : June 10, 1997
INVENTOR(S)    : Nishimori et al.

It is certified that error appears in the above-identified patent and that said Letters Patent is hereby corrected as shown below:

IN THE TITLE PAGE

[57]   ABSTRACT:

Line 1, "as" should be deleted

IN THE DRAWINGS:

SHEET 2:

Fig. 2, "PERFROM" should read --PERFORM--.

SHEET 5:

Fig. 5, "FROWCHART" should read --FLOWCHART--.

SHEET 10:

Fig. 10, "CONPUTE" should read --COMPUTE--; and
            "PERFROM" should read --PERFORM--.

UNITED STATES PATENT AND TRADEMARK OFFICE
CERTIFICATE OF CORRECTION

PATENT NO. : 5,638,460
DATED : June 10, 1997
INVENTOR(S) : Nishimori et al.

It is certified that error appears in the above-identified patent and that said Letters Patent is hereby corrected as shown below:

SHEET 27:

Fig. 26, "A" should be deleted.

COLUMN 5:

Line 51, "an" should be deleted.

COLUMN 13:

Lines 30 & 31, "$(u_{ji})^P$" should read --$(uji)^P$--; and

COLUMN 14:

Line 61, "PUQ)" should read --(PU-.Q)--.

Signed and Sealed this

Fourth Day of May, 1999

Q. TODD DICKINSON

*Attest:*

*Attesting Officer*     *Acting Commissioner of Patents and Trademarks*